US008436889B2

(12) United States Patent
Eleftheriadis et al.

(10) Patent No.: US 8,436,889 B2
(45) Date of Patent: May 7, 2013

(54) SYSTEM AND METHOD FOR VIDEOCONFERENCING USING SCALABLE VIDEO CODING AND COMPOSITING SCALABLE VIDEO CONFERENCING SERVERS

(75) Inventors: Alexandros Eleftheriadis, New York, NY (US); Ofer Shapiro, Fair Lawn, NJ (US); Thomas Wiegand, Berlin (DE); Jacob Chakareski, Hackensack, NJ (US)

(73) Assignee: Vidyo, Inc., Hackensack, NJ (US)

( * ) Notice: Subject to any disclaimer, the term of this patent is extended or adjusted under 35 U.S.C. 154(b) by 1471 days.

(21) Appl. No.: 11/615,643

(22) Filed: Dec. 22, 2006

(65) Prior Publication Data

US 2007/0200923 A1 Aug. 30, 2007

Related U.S. Application Data

(60) Provisional application No. 60/753,343, filed on Dec. 22, 2005, provisional application No. 60/778,760, filed on Mar. 3, 2006, provisional application No. 60/787,031, filed on Mar. 29, 2006, provisional application No. 60/774,094, filed on Feb. 16, 2006, provisional application No. 60/827,469, filed on Sep. 29, 2006.

(51) Int. Cl.
*H04N 7/15* (2006.01)
(52) U.S. Cl.
USPC .................. 348/14.09; 348/14.12
(58) Field of Classification Search ......... 348/14.09, 348/14.08; 370/260, 265, 266
See application file for complete search history.

(56) References Cited

U.S. PATENT DOCUMENTS

| | | | |
|---|---|---|---|
| 6,167,084 | A | 12/2000 | Wang et al. |
| 6,496,217 | B1 | 12/2002 | Piotrowski |
| 6,498,865 | B1 | 12/2002 | Brailean et al. |
| 7,082,164 | B2 | 7/2006 | Chaddha |
| 7,461,126 | B2 | 12/2008 | Berkeland et al. |
| 7,593,032 | B2 | 9/2009 | Civanlar et al. |
| 2002/0071485 | A1 | 6/2002 | Caglar et al. |
| 2003/0135631 | A1 | 7/2003 | Li et al. |
| 2004/0131115 | A1 | 7/2004 | Burgess et al. |
| 2004/0236829 | A1 | 11/2004 | Xu et al. |
| 2005/0021833 | A1 | 1/2005 | Hundscheidt et al. |
| 2005/0024487 | A1 | 2/2005 | Chen |

(Continued)

FOREIGN PATENT DOCUMENTS

| | | |
|---|---|---|
| CN | 1263421 A | 8/2000 |
| CN | 1315118 A | 8/2001 |

(Continued)

OTHER PUBLICATIONS

U.S. Appl. No. 11/865,478, filed Oct. 1, 2007.

(Continued)

*Primary Examiner* — Stella Woo
(74) *Attorney, Agent, or Firm* — Baker Botts L.L.P.

(57) ABSTRACT

Systems and methods for videoconferencing are provided. The systems use scalable video coding techniques and a compositing scalable video coding server (CSVCS) to composite input video signals from transmitting conferencing participants into one single output video signal forwarded to a receiving participant. The server is configured to composite the input video signals pictures without decoding, rescaling, and re-encoding of the signals.

67 Claims, 8 Drawing Sheets

VIDEOCONFERENCING SYSTEM

U.S. PATENT DOCUMENTS

| | | | |
|---|---|---|---|
| 2005/0063463 | A1 | 3/2005 | Zhang et al. |
| 2005/0132000 | A1 | 6/2005 | Richardson et al. |
| 2005/0135477 | A1 | 6/2005 | Zhang et al. |
| 2005/0144284 | A1 | 6/2005 | Ludwig et al. |
| 2005/0157164 | A1 | 7/2005 | Eshkoli et al. |
| 2005/0254575 | A1 | 11/2005 | Hannuksela et al. |
| 2005/0265450 | A1 | 12/2005 | Raveendran et al. |
| 2006/0023748 | A1 | 2/2006 | Chandhok et al. |
| 2007/0206673 | A1* | 9/2007 | Cipolli et al. .............. 375/240.1 |
| 2009/0219990 | A1 | 9/2009 | Han et al. |

FOREIGN PATENT DOCUMENTS

| | | |
|---|---|---|
| GB | 2384932 | 8/2003 |
| JP | 2002 534894 | 10/2002 |
| JP | 2004260362 A | 9/2004 |
| JP | 2005130428 A | 5/2005 |
| JP | 2005-229400 | 8/2005 |
| WO | WO03/065720 | 8/2003 |
| WO | WO2004/036916 | 4/2004 |
| WO | WO2005/009038 | 1/2005 |

OTHER PUBLICATIONS

U.S. Appl. No. 12/539,501, filed Aug. 11, 2009.
U.S. Appl. No. 12/015,945, Jan. 17, 2008 Preliminary Amendment.
U.S. Appl. No. 12/015,945, Aug. 8, 2008 Non-Final Office Action.
U.S. Appl. No. 12/015,945, Nov. 10, 2008 Response to Non-Final Office Action.
U.S. Appl. No. 12/015,945, Mar. 6, 2009 Final Office Action.
U.S. Appl. No. 12/015,945, Apr. 15, 2009 Response to Final Office Action.
U.S. Appl. No. 12/015,945, May 13, 2009 Notice of Allowance.
(ITU-T H.264) "ITU Recommendation H.264: Advanced video coding for generic audiovisual services" in: International Telecommunication Union (on Line, URL:http://www.itu.int/rec/T-REC-H.264/en) Mar. 2005, entire document.
International Search Report and Written Opinion—PCT/US06/062569 (International Filing Date: Dec. 22, 2006).
International Search Report and Written Opinion—PCT/US06/028366 (International Filing Date: Jul. 21, 2006).
International Search Report and Written Opinion—PCT/US06/080089 (International Filing Date: Oct. 1, 2007).
Supplemental European Search Report for EP06788107.8, dated Jun. 8, 2011.
"Packet-based multimedia communications systems; H.323 (Nov. 2000)"; ITU-T Standard Superseded (S), Intenrational Telecommunication Union, Geneva, CH; No. H.323; Nov. 1, 2000, XP017401474, *paragraphs [3.18], [3.24], [3.33], [3.34], [3.46], [6.4], [9.6], [Annex B]*.
Gharavi et al., "Video coding and distribution over ATM for multipoint teleconferencing", Proceedings of the Global Communications Conference (GLOBECOM), Houston, Nov. 29-Dec. 2, 1993; [Proceedings of the Global Communications Conference (GLOBECOM)], New York, IEEE, US, vol. 2 of 4, pp. 1-7, Nov. 29, 1993, XP000428020.
Honda et al., "Proposal of applications and requirements for scalable video coding" ITU Study Group 16—Video Coding Experts Group—ISO/IEC MPEG & ITU-T VCEG (ISO/IEC JTC1/SC29/WG11 and ITU-T SG16 06); No. M9453, Mar. 3, 2003, XP030038369.
"Scalable video coding applications and requirements", ITU Study Group 16—Video Coding Experts Group—ISO/IEC MPEG & ITU-T VCEG (ISO/IEC JTC1/SC29/WG11 and ITU-T SG16 Q6), No. N6880, Jan. 21, 2005, XP030013600.
Hannuksela, M.H., et al., "Coding of parameter sets" Joint Video Team (JVT) of ISO/IEC MPEG & ITU-T VCEG (ISO/IEC JTC1/SC29/WG11 and ITU-TSG16 Q.6) Document No. JVT-C078, May 6, 2002, URL: http://wftp3.itu.int.av-arch/jvt-site/2002_05_Fairfax/JVT-C078.doc.
U.S. Appl. No. 12/539,501, Oct. 20, 2011 Non-Final Office Action.
U.S. Appl. No. 12/539,501, May 25, 2012 Notice of Allowance.
U.S. Appl. No. 12/539,501, Apr. 20, 2012 Response to Non-Final Office Action and Terminal Disclaimer.
U.S. Appl. No. 11/865,478, Feb. 22, 2012 Non-Final Office Action.
U.S. Appl. No. 13/595,437, filed Aug. 27, 2012.
U.S. Appl. No. 11/865,478, Sep. 25, 2012 Notice of Allowance.
U.S. Appl. No. 13/595,437, Mar. 1, 2013 Non-Final Office Action.

* cited by examiner

FIG. 1: VIDEOCONFERENCING SYSTEM
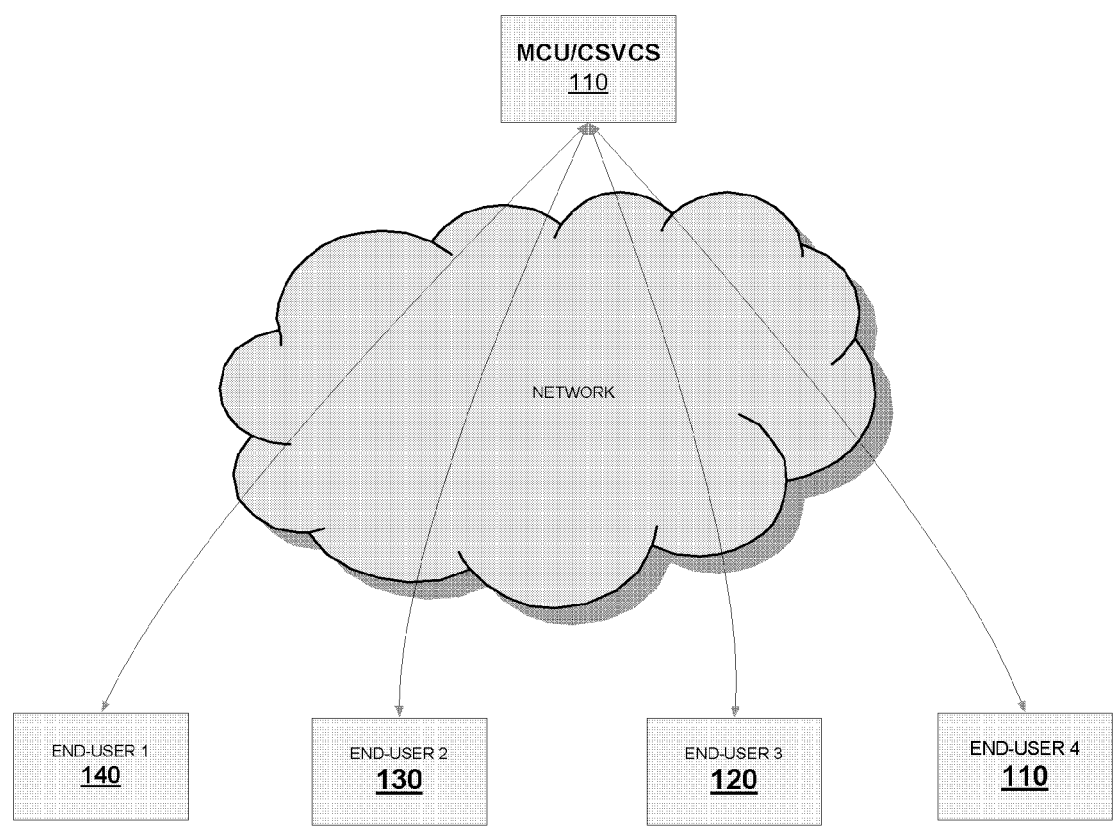

FIG. 2: PARTITIONING OF THE PICTURE INTO SLICE GROUPS
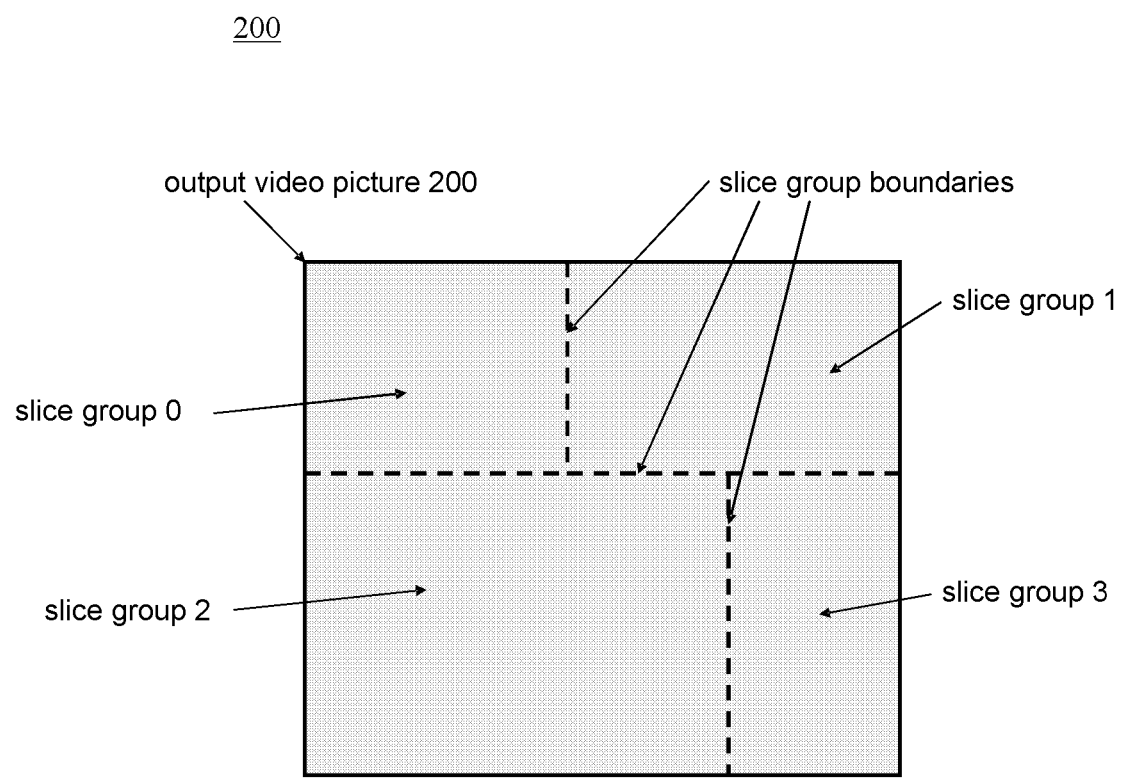

FIG. 3:ASSIGNMENT OF INPUT VIDEOS TO SLICE GROUPS
200
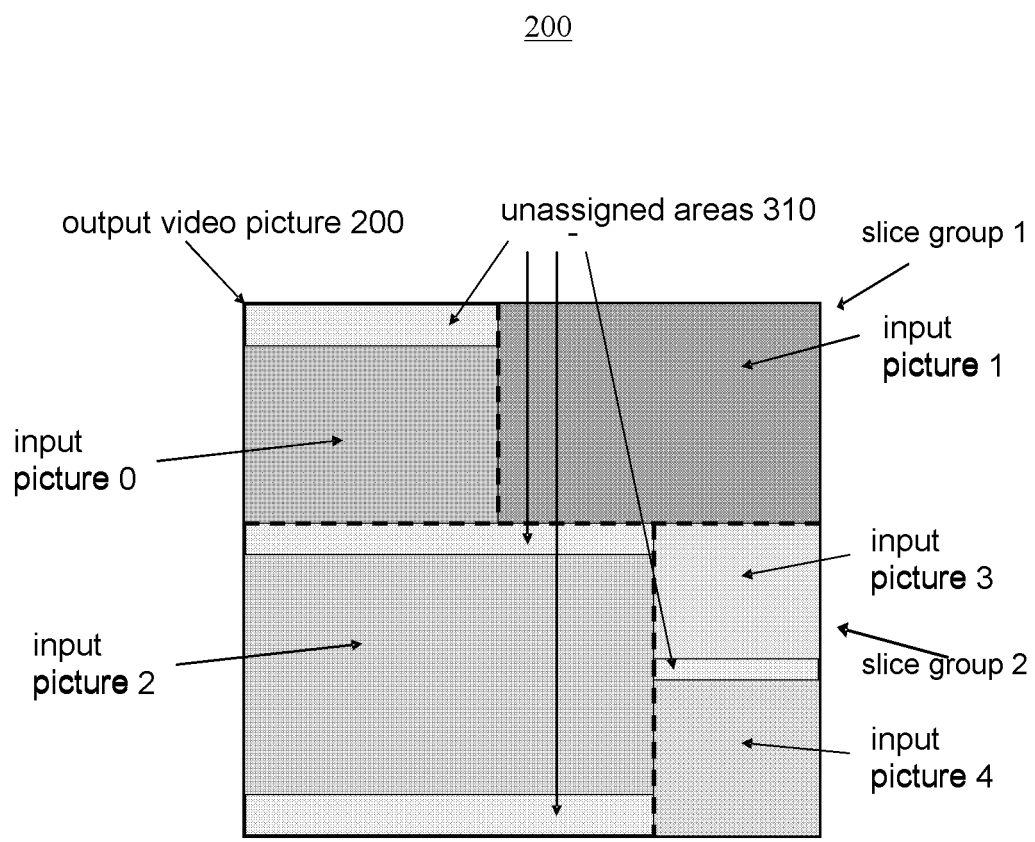

FIG. 4: LAYERED PICTURE CODING STRUCTURE: TEMPORAL LAYERING
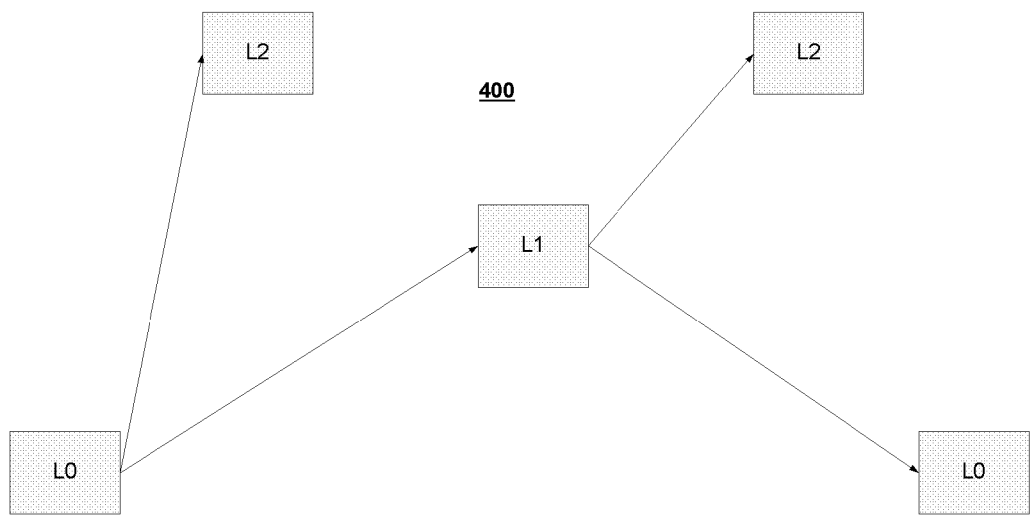

FIG. 5:LAYERED PICTURE CODING STRUCTURE: SPATIAL OR SNR LAYERING
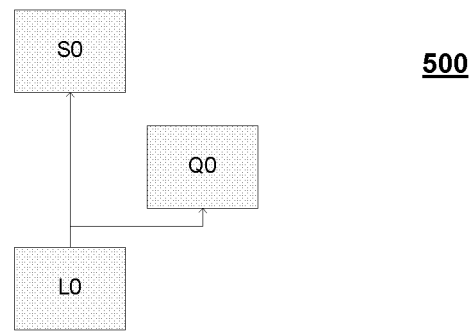
500

FIG. 6: LAYERED PICTURE CODING STRUCTURE
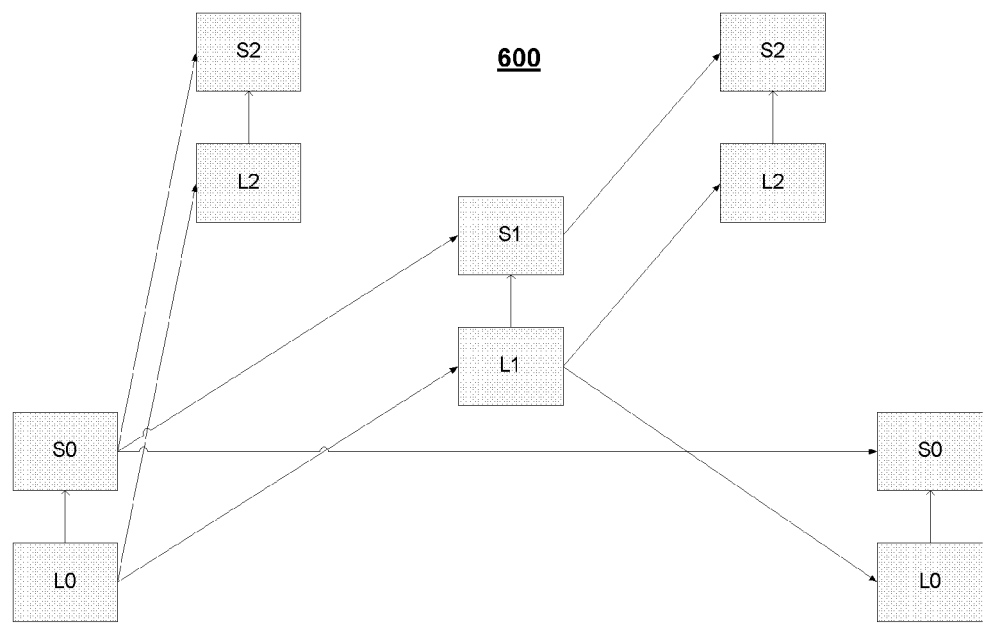

FIG. 7: COMPOSITE CSVCS OUTPUT PICTURE (EXAMPLE)
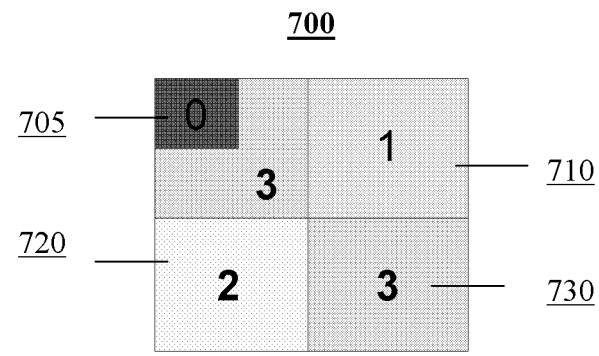

FIG. 8: CONSTRUCTION OF ARTIFICIAL LAYERS WHEN DIFFERENT SPATIAL SCALABILITY RATIOS ARE COMBINED (EXAMPLE)
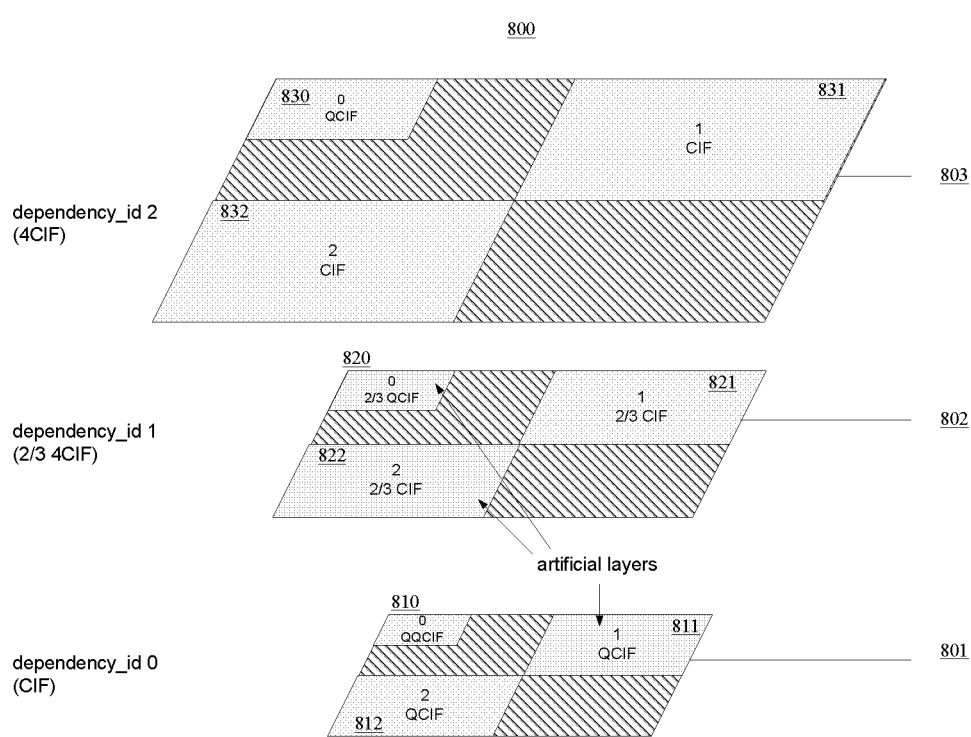

SYSTEM AND METHOD FOR VIDEOCONFERENCING USING SCALABLE VIDEO CODING AND COMPOSITING SCALABLE VIDEO CONFERENCING SERVERS

CROSS-REFERENCE TO RELATED APPLICATIONS

This application claims the benefit of U.S. provisional patent application Ser. No. 60/753,343 filed Dec. 22, 2005. Further, this application is related to International patent application Nos. PCT/US06/28365, PCT/US06/028366, PCT/US06/028367, PCT/US06/027368, and PCT/US06/061815, as well as U.S. provisional patent application Nos. 60/778,760, filed Mar. 3, 2006, 60/787,031, filed Mar. 29, 2006, 60/774,094, filed Feb. 16, 2006, and 60/827,469, filed Sep. 29, 2006. All of the aforementioned priority and related applications are hereby incorporated by reference herein in their entireties.

FIELD OF THE INVENTION

The present invention relates to multimedia technology and telecommunications. In particular, the invention relates to the communication or distribution of audio and video data for person-to-person and multiparty conferencing applications. More specifically, the present invention is directed to implementations of person-to-person or multiparty conferencing applications in which some participants may only be able to support reception of a video bitstream corresponding to a single picture, encoded using scalable video coding techniques. The present invention is also directed towards implementation of such systems over communication network connections that can provide different levels of quality of service (QoS), and in environments in which end-users may access the conferencing applications using devices and communication channels of differing capabilities.

BACKGROUND OF THE INVENTION

Videoconferencing systems allow two or more remote participants/endpoints to communicate video and audio with each other in real-time using both audio and video. When only two remote participants are involved, direct transmission of communications over suitable electronic networks between the two endpoints can be used. When more than two participants/endpoints are involved, a Multipoint Conferencing Unit (MCU), or bridge, is commonly used to connect all the participants/endpoints. The MCU mediates communications between the multiple participants/endpoints, which may be connected, for example, in a star configuration. It is noted that even when only two participants are involved, it may still be advantageous to utilize an MCU between the two participants.

For a videoconference, the participants/endpoints or terminals are equipped with suitable encoding and decoding devices. An encoder formats local audio and video output at a transmitting endpoint into a coded form suitable for signal transmission over the electronic network. A decoder, in contrast, processes a received signal, which has encoded audio and video information, into a decoded form suitable for audio playback or image display at a receiving endpoint.

Traditionally, an end-user's own image is also displayed on his/her screen to provide feedback (to ensure, for example, proper positioning of the person within the video window).

In practical videoconferencing system implementations over communication networks, the quality of an interactive videoconference between remote participants is determined by end-to-end signal delays. End-to-end delays of greater than 200 ms prevent realistic live or natural interactions between the conferencing participants. Such long end-to-end delays cause the videoconferencing participants to unnaturally restrain themselves from actively participating or responding in order to allow in-transit video and audio data from other participants to arrive at their endpoints.

The end-to-end signal delays include acquisition delays (e.g., the delay corresponding to the time it takes to fill up a buffer in an A/D converter), coding delays, transmission delays (e.g., the delay corresponding to the time it takes to submit a packet of data to the network interface controller of an endpoint), and transport delays (the delay corresponding to the time it takes a packet to travel from endpoint to endpoint over the network). Additionally, signal-processing times through mediating MCUs contribute to the total end-to-end delay in the given system.

An MCU's primary tasks are to mix the incoming audio signals so that a single audio stream is transmitted to all participants, and to mix video frames or pictures transmitted by individual participants/endpoints into a common composite video frame stream, which includes a picture of each participant. It is noted that the terms frame and picture are used interchangeably herein, and further that coding of interlaced frames as individual fields or as combined frames (field-based or frame-based picture coding) can be incorporated as is obvious to persons skilled in the art. The MCUs, which are deployed in conventional communication network systems, only offer a single common resolution (e.g., CIF or QCIF resolution) for all the individual pictures mixed into the common composite video frame distributed to all participants in a videoconferencing session. Thus, conventional communication network systems do not readily provide customized videoconferencing functionality, which enables a participant to view other participants at different resolutions. The customized functionality may, for example, enable the participant to view another specific participant (e.g., a speaking participant) in CIF resolution, and to view other silent participants in QCIF resolution. The MCUs in a network can be configured to provide such customized functionality by repeating the video mixing operation as many times as the number of participants in a videoconference. However, in such configurations, the MCU operations introduce considerable end-to-end delays. Further, the MCU must have sufficient digital signal processing capability to decode multiple audio streams, mix, and re-encode them, and also to decode multiple video streams, composite them into a single frame (with appropriate scaling as needed), and re-encode them again into a single stream. Video conferencing solutions (such as the systems commercially marketed by Polycom Inc., 4750 Willow Road, Pleasanton, Calif. 94588, and Tandberg, 200 Park Avenue, New York, N.Y. 10166) must use dedicated hardware components to provide acceptable quality and performance levels.

Traditional video codecs, whose bitstreams and decoding operation are standardized in ITU-T Recommendation H.261; ITU-T Recommendation H.262|ISO/IEC 13818-2 (MPEG-2 Video) Main profile; ITU-T Recommendation H.263 baseline profile; ISO/IEC 11172-2 (MPEG-1 Video); ISO/IEC 14496-2 simple profile or advanced simple profile; ITU-T Recommendation H.264|ISO/IEC 14496-10 (MPEG4-AVC) baseline profile or main profile or high profile, are specified to provide a single bitstream at a given spatial resolution and bit rate. Hence, when for an encoded video signal a lower spatial resolution or lower bit rate is required compared to the originally encoded spatial resolution or bit rate, the full resolution signal must be received and decoded, potentially downscaled, and re-encoded with the desired spatial resolution and bit rate. The process of decoding, potentially downsampling, and re-encoding requires significant computational resources and typically adds significant subjective distortions to the video signal and delay to the video transmission.

Further, the standard video codecs for video communications are based on "single-layer" coding techniques, which are inherently incapable of exploiting the differentiated QoS capabilities provided by modern communication networks. An additional limitation of single-layer coding techniques for video communications is that even if a lower spatial resolution display is required or desired in an application, a full resolution signal must be received and decoded with downscaling performed at a receiving endpoint or MCU. This wastes bandwidth and computational resources.

In contrast to the aforementioned single-layer video codecs, in "scalable" video codecs based on "multi-layer" coding techniques, two or more bitstreams are generated for a given source video signal: a base layer and one or more enhancement layers. The base layer may be a basic representation of the source signal at a minimum quality level. The minimum quality representation may be reduced in the quality (i.e. signal to noise ratio ("SNR")), spatial, or temporal resolution aspects or a combination of these aspects of the given source video signal. The one or more enhancement layers correspond to information for increasing the quality of the SNR, spatial, or temporal resolution aspects of the base layer. Scalable video codecs have been developed in view of heterogeneous network environments and/or heterogeneous receivers.

Scalable coding has been a part of standards such as ITU-T Recommendation H.262|ISO/IEC 13818-2 (MPEG-2 Video) SNR scalable or spatially scalable or high profiles. However, practical use of such "scalable" video codecs videoconferencing applications has been hampered by the increased cost and complexity associated with scalable coding, and the lack of widespread availability of high bandwidth IP-based communication channels suitable for video.

Co-pending and commonly assigned International patent application No. PCT/US06/02836, incorporated by reference herein, describes practical scalable video coding techniques specifically addressing videoconferencing applications. Further, copending and commonly assigned International patent application No. PCT/US06/02835, incorporated by reference herein, describes conference server architecture designed to exploit and benefit from the features of scalable video coding techniques for videoconferencing applications. Co-pending and commonly assigned International patent application No. PCT/US06/061815, incorporated by reference herein, describes techniques for providing error resilience, layer switching, and random access capabilities in conference server architectures designed to exploit and benefit from the features of scalable video coding techniques for videoconferencing applications.

Currently, an extension of ITU-T Recommendation H.264|ISO/IEC 14496-10 standard, which offers a more efficient trade-off than previously standardized scalable video codecs, is being considered (Annex G, Scalable Video Coding—SVC). Further developments in video coding research and standardization include the concept of multiple slice groups for error resilience and video mixing in MCUs, i.e., for compositing multiple input videos into one output video. (See S. Wenger and M. Horowitz, "Scattered Slices: A New Error Resilience Tool for H.26L," JVT-B027, Document of Joint Video Team (JVT) of ITU-T SG16/Q.6 and ISO/IEC JTC 1/SC 29/WG 11 and ITU-T Recommendation H.264|ISO/IEC 14496-10). When all input video signals are coded using ITU-T Recommendation H.264|ISO/IEC 14496-10, no decoding and re-encoding may be needed in an MCU because the various input signals can be placed into the output picture of the MCU as separate slice groups. (See M. M. Hannuksela and Y. K. Wang, "Coding of Parameter Sets," JVT-C078, Document of Joint Video Team (JVT) of ITU-T SG16/Q.6 and ISO/IEC JTC 1/SC 29/WG 11).

Consideration is now being given to improving conference server or MCU architectures for video conferencing applications. In particular, attention is being directed toward developing server architectures for compositing one or more input video signals into a single output video signal, together with possible server-generated data, using coded domain composition techniques such as multiple slice groups. Desirable conference server architectures will support desirable video conferencing features such as continuous presence, personal view or layout, rate matching, error resilience, and random entry, and will avoid the complexity and delay overhead of the conventional MCU.

SUMMARY OF THE INVENTION

Systems and methods for videoconferencing are provided. Each video conferencing participant transmits coded data bitstreams to a conferencing bridge MCU or server. The coded data bitstreams may be single-layer or scalable video coded (SVC) data and/or scalable audio coded (SAC) data bitstreams from which multiple qualities can be derived. The MCU or server (e.g., hereinafter "a compositing scalable video coding server" (CSVCS)) is configured to compose the input video signals from transmitting conferencing participants into one single composite output video signal forwarded to a receiving participant. The CSVCS is particularly configured to compose the output video signal pictures without decoding, rescaling, and re-encoding the input signals, thereby introducing little or no end-to-end delay. This "zero-delay" architecture of the CSVCS advantageously enables their use in cascading configurations. The composited output bitstream of the CSVCS is such that a single video decoder can decode it.

In videoconferencing applications, each participant transmits a scalable data bitstream having multiple layers (e.g., a base layer and one or more enhancement layers, which are coded using SVC) to the CSVCS over a corresponding number of physical or virtual channels. Some participants may also transmit single-layer bitstreams. The CSVCS may select parts of the scalable bitstream from each participant according to requirements that are based on properties and/or settings of a particular receiving participant. The selection may be based on, for example, the particular receiving participant's bandwidth and desired video resolutions.

The CSVCS composes the selected input scalable bitstream parts into one (or more) output video bitstreams that can be decoded by one (or more) decoders. When SVC is used for the output video bitstream, the compositing is accomplished by assigning each input video signal to a slice of a different slice group of the output video signal, together with possible generation of supplemental layer data so that the output stream is a valid SVC bitstream. The CSVCS is configured to generate the composite output video signals with no or minimal signal processing. The CSVCS may, for example, be configured to read packet headers of the incoming data so that it can selectively multiplex the appropriate packets into the access units of the output bitstream to compose the output signals, and to then transmit the composed output signals together with any generated layer data, to each of the participants.

In videoconferencing situations, the input video signal contents may or may not be sufficient to cover all areas of a picture in the output bitstream at a given instant in time. The insufficiency may be due to, for example, a different temporal resolution of the input video signals, a shift between the temporal sampling of the input video signals, and an incomplete filling of the output video signal. The CSVCS may be configured to remedy the problem of insufficient picture area coverage by generating a higher temporal resolution of the output video signal to minimize end-to-end delay or minimize other problems caused by late arriving input video signals. For example, CSVCS may be configured to insert pre-coded slices retrieved from an accessible storage medium for those parts of the output video signal for which input video signal content is not present or available. The pre-coded slices may consist of headers and coded slice data that may be computed or pre-computed by the CSVCS according to the particular layout of the output picture. Alternatively, the CSVCS may process the input video signals at a higher temporal resolution by inserting coded picture data that instruct the receiving endpoint to simply copy a previously coded picture. It should be noted that such coded picture data has extremely small length, in the order of several bytes.

An exemplary embodiment of a videoconferencing system, in accordance with the present invention, may include communication network connections on which differentiated Quality of Service (QoS) is provided (i.e., provide a high reliability transmission channel for some portion of the required total bandwidth, a video codec, a CSVCS, and end-user terminals. The video codec for transmitting participants is either single-layer video, or scalable video such that it offers scalability both in terms of temporal, quality, or spatial resolution at different transmission bandwidth levels. The video codec for at least one of the receiving participants supports scalable video decoding. The end-user terminals used by the transmitting and receiving participants may be either dedicated hardware systems or general purpose PCs, which are capable of running multiple instances of video decoders and at least one instance of a video encoder. An implementation of the exemplary system may combine the functionality of traditional MCUs and/or the functionality of other conferencing servers (such as the SVCS described in No. PCT/US06/28366) with that of a CSVCS described herein. In such a combined system, MCU, SVCS, and CSVCS functions may be selectively used, individually or in combination, to service different portions or entities in a videoconferencing session.

The functionality of a CSVCS can complement the functionality of a SVCS. The CSVCS may be configured to have some or all of the functionality and advantages of the SVCS. However, the CSVCS will differ from the SVCS at least in that instead of sending multiple SVC streams to each endpoint like the SVCS does, the CSVCS will encapsulate or compose the individual streams in a single output SVC stream in which the individual streams are assigned to different slice groups. The CSVCS can then be considered for all purposes to be an SVCS in which the output stage further includes the additional process of slice-group-based assignment, together with generation of additional layer data that may be needed to ensure that the output bitstream is compliant. It should be noted that all SVCS functionality (e.g., rate matching, personalized layout, error resilience, random access and layer switching, rate control) can thus be supported on a CSVCS, and that the number of packets transmitted from a CSVCS is nearly identical to the number that would be transmitted from an SVCS in an identical conferencing setup.

BRIEF DESCRIPTION OF THE DRAWINGS

Further features, the nature, and various advantages of the invention will be more apparent from the following detailed description of the preferred embodiments and the accompanying drawings in which:

FIG. 1 is a schematic illustration of a video conferencing system in which a Compositing Scalable Video Conferencing Server (CSVCS) is configured to deliver scalable video and audio data from an endpoint transmitter to client receivers, in accordance with the principles of the present invention;

FIG. 2 is a block diagram illustrating an exemplary partitioning of an output video picture into slice groups, in accordance with the principles of the present invention;

FIG. 3 is a block diagram illustrating an exemplary assignment of input videos to the various slice groups in an output video picture, in accordance with the principles of the present invention;

FIG. 4 is a block diagram illustrating an exemplary layered picture coding structure for temporal layers, in accordance with the principles of the present invention;

FIG. 5 is a block diagram illustrating an exemplary layered picture coding structure for SNR or spatial enhancement layers, in accordance with the principles of the present invention; and FIG. 6 is a block diagram illustrating an exemplary layered picture coding structure for the base, temporal enhancement, and SNR or spatial enhancement layers with differing prediction paths for the base and enhancement layers, in accordance with the principles of the present invention.

FIG. 7 is a block diagram illustrating an exemplary partitioning of an output video picture into slice groups in a slice-group based composition process, in accordance with the principles of the present invention.

FIG. 8 is a block diagram illustrating an exemplary structure for the construction of artificial layers in the composition of the output video signal transmitted from a CSVCS in which different spatial scalability ratios are combined, in accordance with the principles of the present invention.

DETAILED DESCRIPTION OF THE INVENTION

The present invention provides systems and methods for implementing videoconferencing systems that use scalable video coding with servers that provide compositing of pictures in the coded domain. The systems and methods deliver video and audio data, which is encoded by transmitting videoconferencing participants using either single-layer coding or scalable coding techniques. Scalable video coding techniques encode the source data into a number of different bitstreams (e.g., base layer and enhancement layer bitstreams), which in turn provide representations of the original signal in various temporal resolutions, quality resolutions (i.e. in terms of SNR), and, in the case of video, spatial resolutions. Receiving participants are able to decode bitstreams, which are encoded using scalable video coding techniques and include multiple slice group features for various input signals.

A plurality of servers may be present in the communication path between a transmitting participant or endpoint, and a receiving participant or endpoint. In such case, at least the last server in the path will perform composition of the incoming video pictures from transmitting participants into a single composite output picture coded using scalable video coding techniques, and will transmit the composite output picture to the receiving participant. Significantly, the composition process at or by the server does not require decoding and recoding of the picture data received from transmitting participants, but may require generation of additional layer data to ensure that the output bitstream is compliant to the requirements of a scalable video decoder.

For reference and as an aid to understanding the invention, for an embodiment of the invention (hereinafter the "SVC embodiment"), which is described herein, it is assumed that the base layer bitstream conforms to ITU-T Recommendation H.264|ISO/IEC 14496-10 (MPEG4-AVC) as specified in ITU-T and ISO/IEC JTC 1, "Advanced video coding for generic audiovisual services," ITU-T Recommendation H.264 and ISO/IEC 14496-10 (MPEG4-AVC). Further, it is assumed that the enhancement layer bitstreams conform to the scalable extension of ITU-T Recommendation H.264|ISO/IEC 14496-10 (MPEG4-AVC) (Annex G, Scalable Video Coding, hereinafter "SVC"). The use of SVC codecs may be beneficial, for example, when varying picture sizes of the input video signals are requested to be present in the output video picture of the MCU. It is noted that the H.264 AVC and SVC standards are distinct. SVC is a separate Annex of H.264 that will appear in the 2007 edition of H.264. For the described embodiment of the invention, H.264 AVC is used for the scalable codec base layer, whereas H.264 SVC is used for the scalable codec enhancement layer(s). However, for convenience in description, the scalable video codecs used for the base layer (H.264 AVC) and the enhancement layers (H.264 SVC) may be collectively referred to herein as "SVC" codecs. It should be further noted that, although H.264 AVC is considered to be a single-layer codec, it does provide scalability in the temporal dimension. It will also be understood that the use of the H.264 AVC and H.264 SVC codecs in the described embodiment of the invention is only exemplary, and that other codecs suitable for compositing pictures may be used instead in accordance with the principles of the invention.

FIG. 1 shows an exemplary system 100, which may be implemented in an electronic or computer network environment, for compositing pictures in multipoint and point-to-point conferencing applications. System 100 uses one or more networked servers (e.g., a Compositing Scalable Video Conferencing Server (CSVCS) server 110) to coordinate the delivery of customized data to conferencing participants or clients 120, 130, and 140. CSVCS 110 may, for example, coordinate the delivery of a video stream generated by endpoint 140 for transmission to other conference participants. In system 100, using SVC techniques video stream 150 first is suitably coded or scaled down into a multiplicity of data components or layers. The multiple data layers may have differing characteristics or features (e.g., spatial resolutions, frame rates, picture quality, signal-to-noise ratios (SNR), etc.). The differing characteristics or features of the data layers may be suitably selected in consideration, for example, of the varying individual user requirements and infrastructure specifications in the electronic network environment (e.g., CPU capabilities, display size, user preferences, and bit rates).

CSVCS 110 may have scalable video signal processing features similar to those of the scalable video conference servers (SVCS) and scalable audio conference servers (SACS) described in International patent application No. PCT/US06/028366. However, CSVCS 110 is, in particular, further configured to use the H.264 AVC and H.264 SVC codecs for compositing multiple input video signals into one output video signal using multiple slice groups.

In system 100, clients 120, 130 and 140 each may use a terminal suitable for interactive conferencing. The terminal may include human interface input/output devices (e.g., a camera, a microphone, a video display and a speaker) and other signal processing components such as an encoder, a decoder, a multiplexer (MUX) and a demultiplexer (DE-MUX).

Further, as described in co-pending in International patent application No. PCT/US06/028366, in an exemplary terminal the camera and microphone are designed to capture participant video and audio signals, respectively, for transmission to other conferencing participants. Conversely, the video display and speaker are designed to display and play back video and audio signals received from other participants, respectively. The video display may also be configured to optionally display a participant/terminal's own video. The cameras and microphones in the terminals may be coupled to analog-to-digital converters (AD/C), which in turn are coupled to their respective encoders. The encoders compress the local digital signals in order to minimize the bit rate necessary for transmission of the signals. The output data of the encoders may be "packetized" in RTP packets (e.g., by a Packet MUX) for transmission over an IP-based network. The Packet MUX may perform traditional multiplexing using the RTP protocol, and also may implement any needed QoS-related protocol processing. For example, as described in co-pending International patent application No. PCT/US06/061815, QoS support may be provided by positive and/or negative acknowledgments, coupled with marking of the packets essential for decoding of at least the lowest temporal level of the base layer for reliable delivery. Each stream of data of a terminal may be transmitted in its own virtual channel, or port number in IP terminology.

In an implementation of the SVC embodiment of the invention, system 100 exploits the properties of multiple splice groups in compositing output pictures by using AVC or SVC codecs for the input bitstreams to the CSVCS, and SVC for the output video bitstreams from CSVCS 110. However, the audio signals in system 100 may be encoded using any suitable technique known in the art, for example, a technique described in ITU-T Recommendation G.711, or ISO/IEC 11172-3 (MPEG-1 Audio), independent of the compositing of output pictures.

FIG. 2 shows an exemplary output video picture 200 provided by CSVCS 110, which is a composite of multiple slice groups (e.g., slice groups 1, 2, 3, 4). The partitioning or boundaries between the slice groups are indicated in FIG. 2 by dashed lines. Slice groups 1, 2, 3, 4 may be a syntax structure in ITU-T Recommendation H.264|ISO/IEC 14496-10. A particular slice group assignment for a picture may be specified in the bitstream on a picture-by-picture basis in the Picture Parameter Set (PPS) of the ITU-T Recommendation H.264|ISO/IEC 14496-10 bitstream. The PPS may be conveyed in-band or out-of-band as part of the bitstream. Conveying the PPS in-band will require that the PPS be multiplexed into the access units of the bitstream. Conversely, conveying the PPS out-of-band may require that a separate transmission channel be used for PPS transmission, or that the PPS be implemented into the decoder prior to using the decoder in a transmission scenario. The use of up to 256 different PPS is possible. The signaling of which PPS must be used for a picture may be indicated in the slice header through a number reference.

FIG. 3 shows an exemplary assignment of input video signals or pictures to slice groups of output video picture 200

(FIG. 2) generated by CSVCS 110. The assignment of the input video signals may be accomplished in the compressed domain by modifying slice headers and assigning them to the slice groups of the output video. For example, in the assignment shown in FIG. 3, input video signal 0 is assigned to slice group 0, input video signal 1 is assigned to slice group 1, input video signal 2 is assigned to slice group 2, and input video signals 3 and 4 are both assigned to slice group 3. The assignment may be carried out by mapping the input video signals to slices of a slice group in the output picture. This manner of mapping may result in both assigned and unassigned portions and areas 310 in a particular slice group (FIG. 3).

According to ITU-T Recommendation H.264|ISO/IEC 14496-10, an entire decoded picture (e.g., output video picture 200) must be described by coded slice data contained in the bitstream. As the assignment of input video signals to slices of a slice group may result in both assigned and unassigned areas, CSVCS 110 is configured to create coded slice data for the unassigned areas while compositing the pictures.

In an implementation of the SVC embodiment of the present invention, the coded slice data may contain skip macroblock data or Intra-coded macroblock data. The latter data may be needed to create content for the unassigned areas of the output pictures. The Intra-coded data may have any suitable content. The content may, for example, describe picture signals that can be transmitted with small bit rates such as flat gray or black textures. Alternatively or additionally, the content may describe the addition of user information, graphical annotation, and MCU control features such as conference control features.

In system 100, the conference control features may be activated in response to simple signaling or request by a client/participant (e.g., signaling by the client/participant pointing to specific coordinates or areas on video display image screen). For this purpose, CSVCS 110 is configured to translate the signals to actions represented by the specific coordinates or areas on the video display image screen (e.g., with image regions depicting and acting as buttons for initiating certain actions). The signaling by the client can be performed, for example, using HTTP techniques, in which the CSVCS provides an HTTP interface for receiving such signals, similar to a web server.

Further, CSVCS 110 may be configured to have multiple versions of coded slice data bits stored on a storage medium accessible to it and/or to generate such coded slice data bits on the fly with minimal complexity according to the conference context in which it is operating.

System 100 may be configured to advantageously minimize the end-to-end delay performance parameters in videoconferencing applications. For example, in system 100 operation, the input video signals to the CSVCS 110 may have a different temporal resolution or have a shift between the temporal sampling of the pictures. Thus, the arrival times at CSVCS 110 of input video signals that form the output video signal may vary. CSVCS 110 may be configured to address the varying arrival times by generating an output picture triggered by the input video signal arrival times. This may result in a higher temporal resolution of the output video signal, and minimize end-to-end delays and other problems caused by late arriving input video signals. Further, CSVCS 110 may be configured to insert pre-coded slices from an accessible storage medium for those parts of a video signal for which no content is present.

In one videoconferencing implementation of the present invention, skipped pictures (i.e. a copy of all the picture content from the previous frame) or low-bit rate coded slices may be used to represent the output picture content that is unchanged. In such videoconferencing implementation, the receiving video conference participants will be able to access the correct reference pictures (i.e., the pictures that were originally intended by the sending participant's encoder to be used as reference pictures) by operating their terminal decoders using the ref_pic_list_reordering syntax structure of ITU-T Recommendation H.264|ISO/IEC 14496-10. Further, CSVCS 110 may be suitably configured to modify the reference picture list reordering. A similar treatment or procedure may be used for any other temporal layering structure that is employed.

In another videoconferencing implementation of the present invention, the input video signals may be coded at increased temporal resolution. The increase in temporal resolution may be achieved by transmitting additional pictures that are copies of the previously coded pictures (i.e., skipped pictures). Independent of the picture resolution, the number of bytes for a skipped CIF picture is 2-3 bytes for the picture/slice header and 2-3 bytes for the skip signaling for the macroblocks. It is noted that this bit rate is negligible. The coded representations of the additional pictures can be stored on a storage medium accessible to the sending participant, or be generated on the fly with minimal complexity and inserted into the bitstream. In the implementation of the SVC embodiment of the present invention, this increase in transmitted macroblocks per second need not adversely affect processing power at the receiving endpoint, as a special provisioning can be implemented to efficiently handle skipped slices. Moreover, the H.264 MaxStaticMBPS processing rate parameter (called MaxStaticMBPS in ITU-T Recommendation H.241) can be used to adjust the ITU-T Recommendation H.264|ISO/IEC 14496-10 level signaling. Given the higher temporal resolution of the input video signals, CSVCS 110 can be operated at that higher temporal resolution. CSVCS 110 may be further configured to decide to include arriving pictures from the input video signals according to a given schedule and to use the non-reference pictures that are inserted as skipped pictures to compensate for arrival jitter. This compensation may be accomplished by replacing the skipped picture with late-arrived coded pictures. In such implementation, the sending participants will be able to utilize the correct reference pictures (i.e., the reference pictures that were originally intended to be used by the sending participant's encoder) by operating their encoders using the ref_pic_list_reordering syntax structure of ITU-T Recommendation H.264|ISO/IEC 14496-10.

In a further multipoint videoconferencing implementation of the present invention, with various participants requesting different bit rates and different spatial and temporal resolutions in system 100, a sending participant may produce a video signal at multiple temporal resolutions. FIG. 4 shows an exemplary layered threading temporal prediction structure 400 for a video signal with multiple temporal resolution pictures L0, L1, L2. It will be noted that the pictures labeled as L2 in FIG. 4 are not used as reference pictures for inter prediction. However, the pictures labeled as L0, and L0 and L1 form prediction chains. When one of these pictures (L0, L1) is not available for reference at a receiving participant's decoder, spatial-temporal error propagation can introduce subjective visual distortions. In the SVC embodiment of the present invention, pictures labeled as L2 sent as input signals to CSVCS 110 may be marked as "not-used-for-reference". When transmitted by the CSVCS as components of the composite output picture, the same L2 pictures have to be marked as "used-for-reference," if other components of the composite picture are marked as used-for-reference. This is in contrast to their utility in the SVCS-based video conferencing system described in International patent application Nos. PCT/US06/28365 and PCT/US06/28366 in which the L2 pictures do not have to be marked as used-for-reference. The difference in the use of L2 pictures arises because ITU-T Recommendation H.264|ISO/IEC 14496-10 does not allow pictures to be a composite of reference and non-reference slices, but only a composite of one or the other. In conformity with ITU-T Recommendation H.264|ISO/IEC 14496-10, if the multiple input video signals to CSVCS 110 at the same time instant contain reference and non-reference slices, they cannot be mixed into the same output picture. Therefore, to mix a non-reference L2 picture into the output stream in the operation of system 100, CSVCS 110 labels and uses the picture L2 as a reference picture. Picture L2 may be coded as a normal-coded picture requiring a similar amount of bits as the pictures L0 or L1 and be inserted into the output picture directed toward a receiving participant who has requested the particular (L2) resolution. For the output picture directed toward another receiving participant who has not requested the pictures labeled as L2, CSVCS 110 may be configured to replace the bits received for the L2 pictures from the corresponding input video signal by the bits corresponding to a skipped picture. In the foregoing multipoint videoconferencing scenario, sending participants will be able to utilize the correct reference pictures for pictures L0 and L2 (i.e., the pictures that were originally intended by the sending participant's encoder to be used for reference) by operating their encoders using the ref_pic_list_reordering syntax structure of ITU-T Recommendation H.264|ISO/IEC 14496-10. This process can be further extended to L1 pictures, and can be used for rate matching and statistical multiplexing purposes, similar to an SVCS.

FIG. 5 shows an exemplary layered structure 500, which is suitable for spatial scalable prediction, alternately an SNR scalable prediction, or a mix of these predictions that may be used in the operation of system 100. In structure 500, the base layer for prediction is labeled L0. Two enhancement layers are labeled as S0 and Q0. S0 does not depend on Q0 and vice versa. However, there may be other layers that depend on S0 or Q0 through prediction. In an implementation of the SVC embodiment of the present invention, L0 may be a QCIF picture, Q0 may be a 3/2 QCIF picture or a CIF picture. In an exemplary multiparty video conferencing scenario, only one receiving participant may request the 3/2 QCIF picture while all the other participants may request the CIF or the QCIF pictures. In this scenario in the operation of system 100, the sending participant, in addition to generating the QCIF and CIF pictures, may also generate the 3/2 QCIF picture for overall system efficiencies in transmission. Further, for this scenario, CSVCS 110 may be suitably configured to forward the bits needed to decode the signals at a respective receiving participant's resolution. Further, for improved CSVCS 110 operation, the sending participant may label the parts of the bitstream that are not designated or used for prediction with a discardable flag, which is described, for example, in International patent application Nos. PCT/US06/28365.

FIG. 6 shows a further layer picture coding structure 600, which combines the temporal layering structure (FIG. 4) and spatial scalable layering structure (FIG. 5). The combined structure can be used in the operation of system 100. In such case, system 100 is configured so that the conferencing entities (i.e., the sending participants each running a scalable video encoder, CSVCS 110, and the receiving participants each running a scalable video decoder) maintain bi-directional control channels between each other. The control channels from a sending participant to CSVCS 110 and from CSVCS 110 to a receiving participant may be referred to herein as the forward control channels. Conversely, the control channels from the receiving participant to CSVCS 110 and from CSVCS 110 to a sending participant may be referred to herein as the backward control channels. In system operation, prior to actual communication amongst the conferencing entities, a capability exchange may be conducted over the control channels. The capability exchange may include the signaling of the ranges of spatial and temporal video resolutions that are supported by each sending participants. The range of sender participant capabilities is conveyed to each receiving participant, who then can accordingly choose or limit his or her requests for video features from the senders.

Through the backward control channel, a receiving participant may request a spatial video resolution that is different from what is being currently sent to it. Similarly, a receiving participant who enters a video conferencing session can request video at a particular spatial video resolution. In the implementation of the SVC embodiment of the present invention, CSVCS 110 is configured to respond to a receiving participant's request by modifying the slice group boundaries for the output picture sent to the receiving participant. Depending on spatial resolutions supported by the sending participant's scalable video encoder, CSVCS 110 may through its backward control channel notify the scalable video encoder whether it needs to support or generate another spatial resolution to satisfy the receiving participant's request.

It is noted here that International patent application No. PCT/US06/28366 describes a scalable video conferencing server (SVCS) designed to process the coding structure, which is described, for example, in International patent application No. PCT/US06/028365. The SVCS described in the former application has various features designed for multipoint conferencing, based on its ability to manipulate video quality, resolution, and bit rate using scalable video coding. The described SVCS assumes that a conference participant's endpoint will deploy several decoders in order to provide the end user with multiple participant views ("continuous presence"). However, in some conferencing situations, it may be advantageous or necessary to run only a single decoder in an endpoint. For such conferencing situations, the described SVCS may be further configured or modified to have and apply the compositing functionality of the CSVCS described herein. In operation, the modified SVCS may utilize the CSVCS 110 functionality after utilizing some or all functionality of the unmodified SVCS.

As an aid to understanding the functionalities of the CSVCS or modified SVCS, it is useful to consider herein examples of how SVCS functionality can be provided by a CSVCS with reference to the related to International patent application Nos. PCT/US06/28365, PCT/US06/028366, PCT/US06/028367, PCT/US06/027368, and PCT/US06/061815, incorporated by reference herein.

First, with reference to International patent application No. PCT/US06/028366, it is noted that the same principle of protecting at least base layer data applied to SVCS operation, which is described in the referenced application, can be applied directly to CSVCS operation, in network connections between a transmitting endpoint and the CSVCS, between the CSVCS and receiving endpoints and also between cascaded CSVCSs. Such quality of service support may be provided by the CSVCS using means and techniques similar or identical to those used by an SVCS such as FEC, ARQ (positive/negative acknowledgments), proactive retransmission, etc. If artificial layers are created by the CSVCS, they can be transmitted over the high or low reliability channel, in the same way as regular layer data (i.e., coded picture data received from the one or more transmitting endpoints). The CSVCS, in manner similar to that of a SVCS, can respond to changing network conditions (e.g., congestion), by selectively eliminating enhancement layer data from the composite output video stream. Statistical multiplexing techniques used by a SVCS can also be used by the CSVCS, so that temporal alignment of pictures in the composite output video stream is performed in a manner such that only a subset of the component pictures received from the transmitting endpoints are allowed to significantly exceed their long-term average size. The CSVCS can also feature audio capability with scalable coded audio streams, in a manner similar to that of an SVCS. For the audio there is no equivalent to the slice group concept that exists in video, which corresponds to "spatial multiplexing." The parallel operations for the audio features of an SVCS is traditional mixing of the audio streams. This audio mixing, however, can be considered to be an additional output stage of the SVCS audio operation, so that algorithms related to, for example, reduction or elimination of audio clipping effects, can still be similarly used by a CSVCS. Finally, the CSVCS can also perform network-related functions such as Network Address Translation, proxying, etc., in the same manner as an SVCS.

It is noted that SVCSs can be deployed together with CSVCSs in a cascade arrangement linking the one or more transmitting endpoints and receiving endpoints. If a composite output picture is required by a receiving endpoint, then it will be advantageous to position a CSVCS as the last server in the cascade arrangement, and to position the SVCSs in other higher positions in the cascade arrangement. It is further noted that the trunking design described in International patent application No. PCT/US06/028367 can be applied to CSVCS/SVCS cascade arrangements, in the same manner as SVCS cascade arrangements.

Further, the jitter reduction techniques for SVCS systems described in International patent application No. PCT/US06/027368 can be applied directly to a CSVCS, where any enhancement layer data that is not transmitted may be replaced by suitable artificial layer data, in accordance with the principles of the present invention.

As a further aid to understanding the functionalities of the CSVCS or modified SVCS, it is useful to consider herein additional examples of how SVCS functionality can be provided by a CSVCS with reference to International patent application No. PCT/US06/061815.

The error resilience, random access, and layer switching techniques described in International patent application No. PCT/US06/061815 in the context of SVCS systems, also have a direct use in a CSVCS system. It is noted that for the application of these techniques the connection between a transmitting endpoint and a CSVCS can be treated in the same manner as a connection between a transmitting endpoint and a SVCS, since the distinctive difference between a SVCS and a CSVCS is in their output video signal formatting and not in the nature of the connection. For the connection between a CSVCS and a receiving endpoint, by considering each slice group data in a CSVCS context as being equivalent to the picture data of a transmitting participant in an SVCS context, and observing that, first, in both cases only packet header data may be different and, second, that additional artificial layer data may be generated by a CSVCS, it is seen that the same error resilience and random access protection techniques can be applied in the output packets of an CSVCS. For example, marking of picture data for reliable transmission in the CSVCS environment can be performed in same manner as in an SVCS environment (e.g., via RTP header extension, RNACKs via RTCP feedback, etc.). The concept of an R picture in an SVCS environment translates to that of an R slice group in the CSVCS environment. Caching of R pictures, use of periodic intra macroblocks at the encoders of the transmitting endpoints, and fast-forward decoding and at a receiving endpoint can also be applied within the context of individual slice groups in the CSVCS environment. Layer switching techniques useful in the SVCS environment can also be used in the same fashion. For example, the concept of server-based intra frames for error recovery or to support new participants can be applied to slice groups in the CSVCS environment. Like an SVCS, the CSVCS will have to decode part of the incoming video data from the transmitting participants, and particularly at least the lowest temporal level of the base layer, and be equipped to re-encode the decoded picture data as intra. When multi-loop decoding capability is available at the receiving endpoint, then layer switching is considerably simplified, as with an SVCS, since the server does not have to supply intra data.

Finally, the rate control techniques described in U.S. provisional patent application Nos. 60/778,760 and 60/787,031, the stream thinning techniques described in U.S. provisional patent application No. 60/774,094, and the multicast SVCS techniques described in U.S. provisional patent application No. 60/827,469 are also directly applicable to a CSVCS. For example, the technique described in provisional patent application No. 60/787,031 whereby an S2 picture is concealed at the decoder by using the coded information of the base layer (mode, motion vectors, etc.), appropriately scaled, can be applied to data within a particular slice group in the CSVCS environment. Significantly, the same concealment effect can be realized by replacing the S2 picture at the CSVCS, and inserting in its place in the composite output picture coded data that instruct the decoder to use the base layer information. A benefit of this approach is the receiving endpoint does not require any special support, and hence any SVC-compliant decoder will operate correctly.

The above examples are illustrative only and are not intended to be exhaustive or limiting. It will be understood that any SVCS operation can be performed in a CSVCS with appropriate handling of the composite output video signal generation process, in accordance with the principles of the present invention.

With renewed reference to FIG. 1, it is further noted that in the operation of system 100 and CSVCS 110, the individual bitstreams associated with the individual participants that are present in the composited bitstream can be easily extracted from the composite bitstream. CSVCS 110 may be configured to straightforwardly extract these individual bitstreams from a composited bitstream and re-insert them into a different composited bitstream. This configuration of CSVCS 110 will enable a cascaded CSVCS 110 to provide full remultiplexing of constituent streams according to the preferences of the participants or downstream servers. Thus, such a CSVCS 110 with remultiplexing capability can fully support the cascading and distributed operation features of extended videoconferencing systems, which are described, for example, in International patent application No. PCT/US06/28366.

System 100 can be further configured, according to the present invention, to convey signal source identification information or other useful information (e.g., directory information, on screen help, etc.) to the individual participants and/or slice groups so that the source identification or other information can be displayed on the participants' display screens. This configuration of system 100 will allow participants to identify the sources of the streams contained in the composite pictures. The identification information may include identifying text strings or pre-composed slice data that are displayed alongside the slice groups that correspond to individual participant's video signals. For example, the identification information may include text strings identifying a participant by name (e.g., "John Smith"), or by location (e.g., "Dallas, Room A"). In a composited picture, the identification information or other conveyed information may be overlaid on the individual pixels of each participant, or may be displayed in the unassigned image regions (e.g., unassigned areas 310, FIG. 3) that surround image areas assigned to the individual participants. The identification information may be transmitted either out-of-band or in-band as private data.

The description of the SVC embodiment of the invention, hereinafter, relates to the specific mechanism of composition using slice groups, as well as to the generation of additional layer data, when necessary to ensure that the output bitstreams is compliant to a scalable video decoder.

In order to assign the input bitstreams to the slice groups in the composite picture, the CSVCS uses a map that describes the layout of the slice groups in the composite picture. In particular, this map, denoted henceforth MapOfMbsToSliceGroups, provides an association between the macroblocks comprising the composite picture of the output bitstream and the slice groups that identify the input bitstreams.

With reference to FIG. 7, assume that there are three incoming streams at resolutions QCIF, CIF, and CIF, respectively, at the server, and that it is desired to create a composite video signal of picture size 4CIF out of the three incoming streams. A possible map MapOfMbsToSliceGroups (map 700) is shown in FIG. 7. In map 700, slice group 705 indexed with 0 corresponds to the QCIF stream, and slice groups 1 and 2 ((710 and 720, respectively) correspond to the CIF streams. The unassigned area 730 in the picture also has a slice group index (e.g., 3 in this case).

It is noted that the map MapOfMbsToSliceGroups (e.g., map 700) is not unique, and that there can be multiple ways of laying out the different slice groups in the composite picture. A specific layout could be obtained by specific requests by users, and be automatically computed by the CSVCS, or any other suitable technique. Similarly, the specific numbering of slice groups can be obtained using any suitable technique, for example, in one technique by indexing the incoming bitstreams, and then locating the corresponding slice groups according to their index, from smallest to largest, in a raster scan, left to right, top to bottom in the composite picture.

It may be required to transmit the map MapOfMbsToSliceGroups to the participant receiving the composite video signal, in order to be able to properly decode it. Such transmission may be accomplished by incorporating MapOfMbsToSliceGroups in the Picture Parameter Set for the composite signal, through the slice group identification syntax, as specified in subclauses 7.3.2.2 and 7.4.2.2 of H.264.

Specifically, MapOfMbsToSliceGroups can be incorporated in the picture parameter set of the composite video signal, by setting:

```
num_slice_groups_minus1 = NumAssignedAreas;
/
slice_group_map_type = 6;
// (denoting explicit assignment of MBs to slice groups)
pic_size_in_map_units_minus1 = NumMbs-1;
for(i=0; i<=pic_size_in_map_units_minus1; i++ )
  slice_group_id[ i ] = MapOfMbsToSliceGroups[i];
``` where for the exemplary assignment of FIG. 7, NumAssignedAreas is 3 and NumMbs is 4 times 396 (4 times CIF) or 1583. It is noted that slice group map type 2 (set of rectangles plus background) can also be used here instead of type 6 (arbitrary assignment).

In order to achieve proper assignment of slices from input bitstreams to corresponding slice groups in the output bitstream, given the slice header syntax as specified by the SVC standard, the CSVCS needs to create an additional map. This additional map is a correspondence map between the macroblock (MB) indices of the individual streams and the MB indices of the composite signal. For example, macroblock index 0 of stream 1 (710 in FIG. 7) corresponds to MB index 22 in the composite picture. Denoting this two-dimensional map as MapMbIndex, for the example given above, MapMbIndex[1][0]=22.

A procedure for assignment of slices to slice groups is as follows: Consider a slice from stream n (e.g., n=0, 1, 2, in the example of FIG. 7) and perform the following steps:

(a) Parse the bitstream of the slice header to figure out the index of the first MB (first_mb_in_slice) in that slice. Let that number be k.

(b) Determine the corresponding index/location of that MB in the composite picture using MapMbIndex. That is MapMbIndex[n][k].

(c) Remove the emulation_prevention_three_byte syntax elements from the NAL units for the slice according to subclause 7.3.1/H.264.

(d) Exchange/replace the existing first_mb_in_slice syntax element with the number MapMbIndex[n][k]

(e) Insert again the emulation_prevention_three_byte syntax elements into the NAL unit, according to subclause 7.3.1/H.264.

The steps (a) through (e) described above are repeated for all slices of all incoming streams that will be included in the composite output picture.

With continued reference FIG. 7, for the area 730 in the composite picture that is unassigned, i.e., not assigned to any of the incoming streams) the CSVCS procedure is as follows:

For the first, or initial, composite picture, the following steps are performed:

(a) Create a slice that would contain the bits of the compressed MBs in this area. For a given limited set of picture sizes and configuration options of the CSVCS, this slice can be pre-stored or otherwise be computed online.

(b) Set slice type (in the slice header) to 2 (I slice).

(c) The index of the first MB in this slice (set in the slice header) should correspond to the location of the first unassigned MB in the composite picture (in the example above this is 11).

(d) Fill up the unassigned area with pixel values that are preferably all of equal value for efficient coding. This value is preferably a gray value, i.e. the sample values should be equal to 128 for efficient use of Intra_16×16_DC prediction mode in the upper left corner MB.

(e) Compress all MBs here as Intra16×16, and set the mb_type parameter in the corresponding MB header to this mode. In particular, depending on the specific location of a macroblock, its mode (mb_type) shall be selected from:

(i) I_16×16_0_0_0 (vertical prediction from the MB above it)
  (ii) I_16×16_1_0_0 (horizontal prediction from the MB left to it)
  (iii) I_16×16_2_0_0 (DC prediction when no neighbors are available) with preference being given to I_16×16_0_0_0 or I_16×16_1_0_0 mb_type values when CAVLC is used. When CABAC is used, preference is given to I_16×16_2_0_0 and this value of mb_type to be equal for all macroblocks in the slice so that CABAC can efficiently code it.

With continued reference FIG. 7, for subsequent pictures of the area 730 in the composite picture that is unassigned, the following steps are performed:

(a) Create a slice that would contain the bits of the compressed MBs in this area. For a given limited set of picture sizes and configuration options of the CSVCS, this slice can be pre-stored or otherwise be computed online.

(b) Set slice type (in the slice header) to 0 (P slice).

(c) The index of the first MB in this slice (first_mb_in_slice) should correspond to the location of the first unassigned MB in the composite picture (in the example of FIG. 7 this is 11)

(d) Set all macroblock types mb_type equal to P_Skip by setting mb_skip_run (for CAVLC) or by setting mb_skip_flag equal to 1 (for CABAC).

It is noted that the composite output picture must have the same values in the temporal_id and dependency_id parameters of the NAL unit header, across all slices and slice groups.

The assignment of temporal_id is obtained as follows:

(a) If the input bitstreams are temporally synchronized with regard to their temporal structure, the output picture is assigned the same values of temporal_id as those assigned to the corresponding input pictures. This is a preferred mode of operation. The output video is operated as the input videos when it comes to temporal layering and error resilience handling.

(b) Otherwise (the input bitstreams are not temporally synchronized), the assignment of temporal_id to the output picture must be conducted to allow all inter prediction structures that are used in the various input bitstreams. In general (and in practice) this results in assigning the same layer number (temporal_id=0) to all pictures of the output bitstream.

The CSVCS, however, can track the temporal dependency structures of the various input bitstreams. Since slices (and, as a result, slice groups) are transmitted in separate packets, error resilience mechanisms that involve packet-based retransmission, forward error correction, and in general any technique designed for an SVCS can be applied to slices, and thus to slice groups, in a CSVCS system.

In a CSVCS system, a procedure for the assignment of dependency_id is as follows:

(a) If the input bitstreams are synchronized so that for all output pictures at all layers the same value of the dependency_id is present in the input pictures, this value or a shifted value of dependency_id is used.

(b) Otherwise (dependency_id differs), the dependency_id values of the input bitstreams are adjusted so that, for each layer of the composite output picture, they are equal across slice groups. This may require an increase on dependency_id value of some of the input signals and addition of extra base layers.

The procedure can be understood with continued reference to the example of FIG. 7. In the example, two CIF signals (slice group 1 710 and 2 720) and one QCIF input signal (slice group 0 705) are composed into a 4CIF output picture. Assume that each of the CIF signals is coded with spatial scalability and that a base layer with QCIF resolution is provided for each signal. The base layer of the output picture is a CIF picture containing (in the example) the two QCIF base layers (dependency_id=0), respectively, of the two CIF enhancement layer input signals (slice groups 1 710 and 2 720, dependency_id=1). Further assume the QCIF input signal (slice group 0 705) has no base layer. Then, its value of dependency_id is equal to 0 and must be increased to 1 when this same signal is used at the same layer as the two CIF input signals (slice groups 1 710 and 2 720) inside the composite output picture. Therefore, an additional QQCIF (quarter QCIF), for example, base layer must be created by the CSVCS for the base layer of the composite output picture. The picture contained in this generated layer may be completely empty, i.e. contain only P_Skip macroblocks and not be used for inter-layer prediction. It is created and added to the composite output picture for the sole purpose of enabling a SVC compliant decoder to properly decode the composite output picture.

When spatial scalability is used, the same ratios of spatial resolutions must be used for the slice groups that correspond to input signals. Depending on the ratios of spatial resolutions, the following steps are performed:

(a) If one ratio of resolutions is present in the input signals (for example input A: QCIF, CIF, 4CIF, and input B: QQVGA, QVGA, VGA, etc., where the ratio is 2), the ratios between the spatial resolutions always match. Then, these resolutions can be mixed at all spatial layers of the composite output picture.

(b) Otherwise (more than one ratio of spatial resolutions is present in the input signals), intermediate layers can be inserted to ensure that the ratios of spatial resolutions are identical for all layers of the composite output picture.

For example, assume that spatial ratios 1.5 and 2 are both present in input signals that are intended to be composited. More precisely, with reference to FIG. 7, assume that the CIF slice group 1 710 input signal has a base layer with 2/3 CIF resolution, that the CIF slice group 2 720 has a QCIF base layer, and that the QCIF slice group 0 has a QQCIF base layer. The CSVCS must be configured to run with 3 spatial layers and corresponding dependency_id values 0, 1, and 2. For these input signals to be inserted into a composite output picture by the CSVCS, intermediate artificial ('dummy') layers need to be generated. This is shown in FIG. 8, where the same composite picture layout of FIG. 7 is used, but where the lower layer pictures with the corresponding layer data of the components of the incoming video signals are also shown. For the CIF input signal 832 of slice group 2 an artificial intermediate layer 822 with 2/3 CIF resolution must be created, whereas for the QCIF input signal 830 of slice group 0 an artificial intermediate layer 820 with resolution 2/3 QCIF must be created. Finally, for the CIF input signal 831 of slice group 1, an artificial base layer 811 needs to be created with QCIF resolution. An efficient way to encode these artificial layers is to code all macroblocks using the P_Skip mode, and not use them for inter-layer prediction, except from the macroblocks of the initial picture that can contain intra coded gray values that can be represented very efficiently, as described earlier.

The further description herein relates to the synchronization of the incoming pictures received from transmitting endpoints to the composite output signal that is transmitted to the one or more receiving endpoints.

It is noted that, since it is very likely that at least one of the incoming frames being part of a composite output picture is used as a reference picture for its own respective stream, the CSVCS needs to flag every outgoing composite picture as a reference picture in the outgoing bitstream. Furthermore, since incoming picture data from the one or more transmitting endpoints arrives asynchronously at the CSVCS, it is possible to have different frame numbers for the same pictures in an incoming bitstream and in the composite outgoing bitstream. This may cause discrepancies when the composite pictures are decoded at the receiving participant, as the proper references to prior pictures in the respective slice groups may not be established properly.

Consequently, the CSVCS needs to address two issues. First, creating a composite picture when the frames of the different incoming streams arrive at the CSVCS temporally unsynchronized. Second, making sure that the pictures comprising the slice groups maintain the proper references for prediction (relative to the composite signal that is sent out).

Synchronization of pictures may be performed by one of the following two techniques:

1. Buffering incoming pictures with a window corresponding to picture arrival times for a given sampling frequency at the CSVCS that is larger or equal to the sampling frequency of the input stream with maximum sampling frequency; and 2. Buffering incoming pictures with a window corresponding to a sampling time at the CSVCS with a period of ΔT, where ΔT is the reciprocal of the frame rate of the composite signal (FPS). In order to create a new composite picture that needs to be sent out at every time sample, we check for new content that has arrived at the CSVCS within the last W time units. The window width W can be selected, for example, to be 1/FPS.

The algorithm below shows an exemplary CSVCS operation for the synchronization of pictures:

```
frame_num=0;
for t=ΔT, 2ΔT, . . . ,
  for each n incoming video stream
    if (New slice data arrived for stream n within (t, t–W])
      Assign this slice data to the corresponding slice group
      Apply ref_pic_list_reordering( ) for each slice in the
        group
      Update maps MapOrigInd and MapCompInd for this
        stream
    else
      Skip this slice data (using general data) in the corre-
        sponding slice group
      Set frame_num in the slice header for every slice in the
        group
    Send this composite picture
    Update the frame counter: frame_num++
``` where the statements:

Apply ref_pic_list_reordering( ) for each slice in the group
Update maps MapOrigInd and MapCompInd for this stream relate to the problem of maintaining the correct reference picture data in the composite output picture and are described herein.

The ref_pic_list_reordering( ) syntax provided in the slice header and the maps MapOrigInd and MapCompInd are employed to create an appropriate reference picture list whenever new content arrives at the server. In particular, the CSVCS needs to keep track of how the original reference picture indices for a slice group (incoming video stream) are mapped to outgoing composite picture indices. Specifically, whenever new slice data of a stream arrives at the CSVCS, the server places its original index at the head of a map called MapOrigIndex and its composite picture index at the head of a map called MapCompIndex, while shifting the original entries for one location to the right, at the same time. Furthermore, if the length of these maps exceeds a certain length at some point, from then on the server would simply discard the last entry in these two maps, whenever a new entry is appended at the top. Hence these maps operate as finite capacity stacks.

The CSVCS maintains a pair of such maps for each of the incoming streams. These maps can then be represented as two-dimensional arrays, where the first index of the map refers to the stream index (n=0, 1, or 2 in the example of FIG. 7), and the size of the second index ranges between zero and a certain predefined number (MaxNumRefFrame), which specifies how many past frames we want to keep track of for the incoming streams.

Assume that new picture slice data arrives for stream n and is being placed in the composite picture in the appropriate slice group. For each slice in the group, the CSVCS performs the following operations on the slice header data:

```
// Check if there is a re-ordering already in place
if( ref_pic_list_reordering_flag_10 = = 1) do
    // you can read this flag from the slice header
    index = 0; CurrPic = frame_num;
    read first reordering_of_pic_nums_idc from the header
    while ( reordering_of_pic_nums_idc != 3 ) do
        if(reordering_of_pic_nums_idc = = 0 ||
        reordering_of_pic_nums_idc = = 1)
        do
            // Short term reference picture
            read abs_diff_pic_num_minus1 from the slice header
            if(reordering_of_pic_nums_idc = = 0)
                PredOrigPic = MapOrigInd[n][index] –
                ( abs_diff_pic_num_minus1 + 1)
            else
                PredOrigPic = MapOrigInd[n][index] +
                ( abs_diff_pic_num_minus1 + 1)
            compIndex = find index( MapOrigInd[n][:] = =
            PredOrigPic)
            PredCompPic = MapComInd[n][compIndex];
            if(CurrPic > PredCompPic)
                abs_diff_pic_num_minus1 = CurrPic –
                PredCompPic – 1;
                write reordering_of_pic_nums_idc = 0 in the
                slice header;
                // replaces the existing value of
                reordering_of_pic_nums_idc
            else
                abs_diff_pic_num_minus1 = PredCompPic –
                CurrPic – 1;
                write reordering_of_pic_nums_idc = 1 in the
                slice header;
                // replaces the existing value of
                reordering_of_pic_nums_idc
            write abs_diff_pic_num_minus1 in the slice header;
            index++;    // Move on to the next entry
            CurrPic = PredCompPic;
        else if( reordering_of_pic_nums_idc = = 2 ) do
            read long_term_pic_num from the slice header
            index_long_term = find ( MapOrigInd[n][:] = =
            long_term_pic_num )
            write MapCompInd[n][index_long_term] in the
            slice header
            read next reordering_of_pic_nums_idc from the
            slice header
    end (while ( reordering_of_pic_nums_idc != 3 ) )
else
    // ( ref_pic_list_reordering_flag_10 = = 0) // there is no
    prior reordering requested
    set ref_pic_list_reordering_flag_10 (= 1) in the slice header
    CurrPic = frame_num;
    for index = 0, ..., MaxNumRefFrame–1
        if(CurrPic > MapCompInd[n][index])
            abs_diff_pic_num_minus1 = CurrPic –
            MapCompInd[n][index] – 1;
            write reordering_of_pic_nums_idc = 0 in the
            slice header;
```

```
        else
            abs_diff_pic_num_minus1 = MapOCompInd[n][index] −
            CurrPic − 1;
            write reordering_of_pic_nums_idc = 1 in the
            slice header;
            write abs_diff_pic_num_minus1 in the slice header;
            CurrPic = MapCompInd[n][index];
        write reordering_of_pic_nums_idc = 3;
end     (of the if-else-check on existing
        ref_pic_list_reordering_flag_10 flag)
```

Note that the operations described herein assumed that only P slices are present. Analogous procedures apply in the case of B slices (setting ref_pic_list_reordering_flag_11 in the slice header), as provided in the slice header through the ref_pic_list_reordering( ) syntax. Further, it is noted that indices of reference pictures are stored from the most recent one arriving at the server (index=0) to the most distant one that has arrived in the past (index=MaxNumRefFrame−1).

Once new picture data arrives from a video stream of a transmitting participant, the CSVCS needs to register its index (if it is a reference picture) in the maps MapOrigInd and MapCompInd so the picture can be used in the operations that follow. In particular, the following operations are performed. First, the CSVCS extracts the original frame number ("orig_frame_num") from any slice header of the new picture data for stream n. Then, the MapOrigInd and MapCompInd are updated as follows (stack insertion):

```
for index = MaxNumRefFrame − 1, ..., 1
    MapOrigInd[n][index]) = MapOrigInd [n][index−1])
    MapCompInd[n][index]) = MapCompInd[n][index−1])
MapOrigInd[n][index−1]) = orig_frame_num;
MapCompInd[n][index−1]) = frame_num;
```

When the temporal coding dependency structures of the incoming video signal received from the transmitting endpoints are compatible, then it is possible for the CSVCS to perfectly align them, even if the frame rates are different. For example, assume that the threaded picture coding structure of International patent application PCT/US06/028365 is used, and that pictures from two incoming participants are composed, one with three layers L0, L1, and L2 at a total of 30 frames per second, and the second one with two layers L0 and L1, at a total of 15 frames per second. The CSVCS can create artificial temporal layer L2' for the second participant, and proceed to construct the composite output picture such that the L0, L1, and L2 pictures of the first participant are composed in the same output pictures as the L0, L1, and L2' pictures of the second participant, respectively. This allows the preservation of the threading pattern within the composite output video picture.

The CSVCS can also perform switching of spatial resolutions, up sampling, as well as shifting of input signals in the composite output video signal.

Up sizing (by 1 layer) is realized by sending intra macroblocks within I slices for all layers, i.e., for the corresponding slice group. All intra is needed, because the value of dependency_id needs to be adjusted as described above and motion compensation across different dependency_id values is not allowed in SVC compliant decoders. The corresponding slice group then covers a larger area of the composite output picture. Other slice groups within the composite output picture may need to be shifted for that. The intra data may be computed at the CSVCS itself, in which case it has to at least decode the lowest temporal level of the base layer, or can be produced by the endpoints upon request from the CSVCS. Down-sizing is performed in the same way as up-sizing.

Up sampling of a particular video signal received from a transmitting endpoint can be performed by inserting an additional enhancement layer generated at the CSVCS, where all macroblocks are encoded so that content is simply copied from the lower layer macroblocks. Inclusion of an additional layer in the video signal of a participant may require reorganization of the entire scalability structure of the composite output picture, using the techniques that are described herein.

Shifting an input signal is preferably done by multiples of macroblocks. The receiver may shift a picture using a user interface request (for example, a mouse drag). The CSVCS accounts for the shift by adjusting the motion vectors accordingly (add/subtract multiples of 16 integer-sample positions). It is noted that motion vectors are typically coded differentially, and in this case it is most likely that only the value of the first motion vector needs to be changed.

While there have been described what are believed to be the preferred embodiments of the present invention, those skilled in the art will recognize that further changes and modifications may be made thereto without departing from the spirit of the invention, and it is intended to claim all such changes and modifications that are within the spirit of the invention.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, microcontrollers, microprocessors, integrated circuits, ASICS, on-line downloadable media, and other available media.

The invention claimed is:

1. A multi-endpoint video signal conferencing system for videoconferencing between a plurality of endpoints over a communications network, the system comprising:
   at least one transmitting endpoint that transmits coded digital video using either a single-layer coding format or a scalable video coding format, and
   at least one receiving endpoint that is capable of decoding at least one digital video stream coded in a scalable video coding format,
   a conferencing bridge ("Compositing Scalable Video Coding Server" (CSVCS)) linked to at least one receiving and at least one transmitting endpoint by at least one communication channel each,
      wherein the CSVCS is configured to compose input video signals received from transmitting endpoints into a single composite coded digital video output signal, and to forward the single composite coded digital video output signal to the at least one receiving endpoint where the CSVCS is configured to compose an output signal picture for at least one of the receiving endpoints by:
      assigning a portion of the composite output picture's area to each transmitting endpoint intended to be included in the composite output picture;
      discarding incoming video signal data received from the transmitting endpoints that correspond to one of: resolutions higher than the one intended for the composed picture; data not needed for decoding at the resolution intended for the composed picture; and a transmitting endpoint that is not to be included in the composite picture;

modifying the remaining data of the incoming coded video signals by changing header information so that they form proper data of the composite output video signal;

generating, when necessary, artificial layer data for at least one of the transmitting endpoint video signals; and transmitting the modified data and any generated lower layer data to the one or more receiving endpoints, such that no decoding or encoding of picture data takes place at the CSVCS.

2. The conferencing system of claim 1, wherein the CSVCS is configured to compose input video signals received from transmitting endpoints into a single composite video output signal, and to forward the single composite video output signal to the at least one receiving endpoint without decoding and/or re-coding the input video signal.

3. The system of claim 1, wherein the communications network comprises Quality of Service (QoS) support, such that high reliability and low reliability transport channels are available for transport of scalable coded video data from transmitting endpoints to the CSVCS and from the CSVCS to the receiving endpoints, and wherein at least the lowest temporal level of the base layer is transmitted reliably over a transport channel between the transmitting endpoints and the CSVCS or the CSVCS and the receiving endpoints.

4. The system of claim 3, wherein QoS is provided via positive acknowledgments, or negative acknowledgments, or both.

5. The system of claim 3, wherein QoS is provided via forward error correction (FEC) techniques.

6. The system of claim 1, wherein the at least one receiving endpoint is capable of decoding video coded in the H.264 SVC scalable video coding format, and wherein:

the assignment of portions of the composite output picture's area to transmitting endpoints intended to be included in the composite output picture is performed by defining a slice group map in the Picture Parameter Set of the composite output signal, with each transmitting endpoint corresponding to one slice group, and the assignment of portions of the composite output picture's area to transmitting endpoints is communicated to the at least one receiving endpoints by transmitting the Picture Parameter Set to the at least one receiving endpoints.

7. The system of claim 6 configured to convey the Picture Parameter Set in-band or out-of band to the one or more receiving endpoints.

8. The system of claim 6 which is further configured so that the composite output picture is flagged as;

used-for-reference, when at least one of the input pictures received from the transmitting endpoints that is included in the composite output picture is flagged as used-for-reference; and not-used-for-reference, when all of the input pictures received from the transmitting endpoints that are included in the composite output picture are flagged as not-used-for-reference, wherein if the composite output picture is flagged as used-for-reference, reference frame reordering commands are inserted in the slices of pictures received subsequently from the transmitting endpoints prior to their transmission to the at least one receiving endpoints, so that proper operation of the reference picture buffers at the one or more receiving endpoints is ensured.

9. The system of claim 6 wherein the NAL extension headers for SVC of the composite output picture NAL units are set such that:

the same dependency_id value is used for the NAL units of the composite output picture that correspond to the highest scalable coding layer present in the composite output picture, and the same but successively lower dependency_id value is used for NAL units of successive lower layers;

and wherein the temporal_level is set such that:

when the arriving pictures from the at least one transmitting endpoints are composed so that the temporal levels are synchronized, then the same temporal_level value is used for the NAL units corresponding to the highest scalable coding layer, and successively lower temporal_level values are used for successive lower layers, and when the arriving pictures from the at least one transmitting endpoints are not composed so that the temporal levels are synchronized, then the value 0 is used for all NAL units of the composite output picture.

10. The system of claim 1 wherein assignment of specific portions of the composite output video picture's area to specific transmitting endpoint video signals by the CSVCS is predefined.

11. The system of claim 1 wherein the assignment of specific portions of the composite output video picture's area to specific transmitting endpoint video signals is performed dynamically by the CSVCS, based on:

requests for specific spatial resolutions from the receiving endpoint, requests for specific spatial positions within the composite output picture from the receiving endpoint, and combinations thereof.

12. The system of claim 1 wherein the CSVCS assignment of specific portions of the composite output video picture's area to specific transmitting endpoint video signals is performed by the CSVCS, taking into account the decoding capabilities or resolution preferences of the at least one receiving endpoints.

13. The system of claim 1 wherein the CSVCS is configured to respond to input video signals having different temporal rates or a shift in the arrival times of the input video signals by at least one of:

transmitting an output picture triggered by incoming pictures;

transmitting an output picture based on the maximum frame rate of the input video signals;

transmitting an output picture based on a predefined time schedule, and wherein the CSVCS is further configured to respond when a new picture of the input video signals does not arrive on time for transmission by:

transmitting pre-coded slice data that instruct the at least one receiving endpoint to repeat data from a previous picture;

inserting reference picture list reordering commands in the picture headers of the following picture of the input video signals prior to transmission to the at least one receiving endpoint, to ensure that proper reference picture selection is performed for the said following picture.

14. The system of claim 13, wherein the CSVCS is further configured to discard and not forward received picture data of a transmitting endpoint if the elimination of the discarded picture data will not adversely affect the decoding process at the at least one receiving endpoint, and to transmit in place of the discarded picture data received picture data of a later picture of the same transmitting endpoint, so that the pictures of the transmitting endpoint are synchronized with those of the other transmitting endpoints in the composite output video signal that is transmitted to the at least one receiving endpoints.

15. The system of claim 1 wherein the CSVCS is further configured to decode at least the lowest temporal level of the lowest spatial and quality resolutions of the video signals received from the at least one transmitting endpoints, and wherein the CSVCS is further configured to generate an intra encoding for the video signal of the transmitting endpoint that is affected when the composite picture configuration for an existing receiving endpoint needs to change, and to transmit the intra encoding to the receiving endpoint in place of the corresponding coded picture data received from the said transmitting endpoint.

16. The system of claim 1, wherein the CSVCS is configured to generate and transmit coded picture data for portions of the composite output video picture's area that are not assigned to any transmitting endpoint.

17. The system of claim 16, wherein the transmitted coded picture data for the portions of the composite output video picture's area that are not assigned to any transmitting endpoint are generated by one of: coding of new content that is generated dynamically; retrieval of coded data that has been previously computed and stored; and a combination thereof.

18. The system of claim 1, further comprising a feedback channel between an endpoint and the CSVCS, wherein the CSVCS is further configured to respond to endpoint instructions communicated via intra content over the feedback channel.

19. The system of claim 1, wherein the coding dependency of the scalable video coding technique used is such that enhancement layers that are not used as references by other layers are flagged as discardable.

20. The system of claim 19, wherein the CSVCS is further configured to optionally discard enhancement layers that are flagged as discardable.

21. The system of claim 1, further comprising bidirectional control channels linking a transmitting endpoint with the CSVCS, and the CSVCS with a receiving endpoint.

22. The system of claim 21 which further configured to provide a capabilities exchange between the transmitting and receiving endpoints over the bi-directional control channel through the CSVCS, whereby the transmitting endpoint indicates its capabilities in terms of spatial, temporal, quality resolutions, and bit rates, and the receiving endpoint indicates which of these capabilities it supports.

23. The system of claim 22, wherein the CSVCS is configured to receive requests from a receiving endpoint for a desired spatial resolution of output video signals.

24. The system of claim 23, wherein the CSVCS is configured to modify the spatial layout in the composite output picture to accommodate different spatial resolution requests.

25. The system of claim 23, wherein the CSVCS is configured to instruct a transmitting endpoint to add or remove a spatial resolution from its transmitted video signal.

26. The system of claim 1, wherein the CSVCS is configured to include source identifying information or other information for display over one of in-band and out-of-band bitstreams.

27. The system of claim 1, wherein the CSVCS is configured to overlay source identifying information or other conveyed information on one of: (1) the pixels of portions of the composite output picture's area that are assigned to each participant in an output picture, and (2) the pixels of portions of the composite output picture's area that are not assigned to any of the video signals of the transmitting participants.

28. The conferencing system of claim 1, wherein the CSVCS is configured to provide at least one of continuous presence, personalized layout, rate matching, error localization, and random entry features to at least one receiving endpoint linked through the CSVCS by selectively multiplexing the video signal layers received from transmitting endpoints as components of the composite output picture, and forwarding the components to the linked receiving endpoint, together with optional additional data generated at the CSVCS that ensures that the composite output signal received at the linked received endpoint is a valid coded video bitstream.

29. The conferencing system of claim 28 wherein the CSVCS is further configured to respond to bandwidth conditions by at least one of:
   statistically multiplexing video signals from a plurality of transmitting endpoints; and
   synchronizing the composition and transmission of video signals received from transmitting endpoints to stagger larger-than-average video pictures in the composite output video signal.

30. The conferencing system of claim 28 wherein the CSVCS is further configured to:
   modify the bitrate of the transmitted composite output signal by replacing coded picture data that is received from the at least one transmitting endpoint with coded data that indicates to the at least one receiving endpoint to copy the corresponding pixel data from a previous picture, and
   transmit the replacement coded data,
   so that the output bitrate can match desired characteristics.

31. The conferencing system of claim 1, wherein the CSVCS is further configured to provide at least one of session network border control, media proxy, firewall, and network address translation functions.

32. A multi-endpoint video signal conferencing system for videoconferencing between a plurality of endpoints over a communications network, the system comprising:
   at least one transmitting endpoint that transmits coded digital video using either a single-layer coding format or a scalable video coding format, and
   at least one receiving endpoint that is capable of decoding at least one digital video stream coded in a scalable video coding format,
   a plurality of conferencing bridges ("Compositing Scalable Video Coding Server" (CSVCS)) in a cascading arrangement linked to at least one receiving and at least one transmitting endpoint by at least one communication channel each,
   wherein at least one CSVCS, which is not the last one in the cascading arrangement, is configured to optionally:
   without processing, forward composite coded pictures received from CSVCS that are earlier in the cascading arrangement to other CSVCSs; or
   decompose the composite coded pictures received from CSVCS that are earlier in the cascading arrangement and recompose them using a different layout prior to forwarding them to other CSVCSs.

33. A multi-endpoint video signal conferencing system for videoconferencing between a plurality of endpoints over a communications network, the system comprising:
   at least one transmitting endpoint that transmits coded digital video using either a single-layer coding format or a scalable video coding format, and at least one receiving endpoint that is capable of decoding at least one digital video stream coded in a scalable video coding format, a conferencing bridge ("Compositing Scalable Video Coding Server" (CSVCS)) linked to at least one receiving and at least one transmitting endpoint by at least one communication channel each, at least one SVCS and at least one CSVCSs in an cascading arrangement, wherein:

the at least one SVCS is configured to only select some or all data of the video signals received from the transmitting endpoints or other SVCSs, and forward the selected data to other SVCSs or CSVCSs, and a CSVCS is the last server in the cascading arrangement, which creates the composite coded output picture for transmission to the one or more receiving endpoints.

34. A method for videoconferencing between a plurality of endpoints over a communications network, the method comprising:

using a conferencing bridge ("Compositing Scalable Video Coding Server" (CSVCS)) linked to at least one receiving and at least one transmitting endpoint by at least one communication channel each;

transmitting coded digital video from at least one transmitting endpoint in either a single-layer coding format or a scalable video coding format; and at the CSVCS, composing input video signals received from transmitting endpoints into a single composite coded digital video output signal, and forwarding the single composite coded digital video output signal to at least one receiving endpoint which is capable of decoding at least one digital video stream coded in a scalable video coding format;

wherein the at the CSVCS, composing input video signals received from transmitting endpoints into a single composite coded digital video output signal, comprises:

assigning a specific portion of the composite output picture's area to each specific transmitting endpoint intended to be included in the composite output picture;

discarding incoming video signal data received from the transmitting endpoints that correspond to one of: resolutions higher than the one intended for the composed picture; data not needed for decoding at the resolution intended for the composed picture; and a transmitting endpoint that is not to be included in the composite picture;

modifying the remaining data of the incoming coded video signals by changing header information so that they form proper data of the composite output video signal;

generating, when necessary, artificial layer data for at least one of the transmitting endpoint video signals; and transmitting the modified data and any generated lower layer data to the one or more receiving endpoints, such that no decoding or encoding of picture data takes place at the CSVCS.

35. The method of claim 34, wherein the CSVCS is configured to compose input video signals received from transmitting endpoints into a single composite video output signal, and wherein forwarding the single composite video output signal to the at least one receiving endpoint comprises doing so without decoding and/or re-coding the input video signal.

36. The method of claim 34, wherein the communications network comprises Quality of Service (QoS) support, such that high reliability and low reliability transport channels are available for transport of scalable coded video data from transmitting endpoints to the CSVCS and from the CSVCS to the receiving endpoints, the method further comprising reliably transmitting at least the lowest temporal level of the base layer over a transport channel between the transmitting endpoints and the CSVCS or the CSVCS and the receiving endpoints.

37. The method of claim 36, further comprising providing QoS via positive acknowledgments, or negative acknowledgments, or both.

38. The method of claim 36, further comprising providing QoS via forward error correction (FEC) techniques.

39. The method of claim 34, wherein the at least one receiving endpoint is capable of decoding video coded in the H.264 SVC scalable video coding format, and wherein:

assigning a portion of the composite output picture's area to each transmitting endpoint intended to be included in the composite output picture is performed by defining a slice group map in the Picture Parameter Set of the composite output signal, with each transmitting endpoint corresponding to one slice group, and transmitting the Picture Parameter Set to the at least one receiving endpoints to communicate the assignment of specific portions of the composite output picture's areas to specific transmitting endpoints to the at least one receiving endpoint.

40. The method of claim 39, further comprising conveying the Picture Parameter Set in-band or out-of band to at least one receiving endpoint.

41. The method of claim 39, further comprising flagging the composite output picture as;

used-for-reference, when at least one of the input pictures received from the transmitting endpoints that is included in the composite output picture is flagged as used-for-reference; and not-used-for-reference, when all of the input pictures received from the transmitting endpoints that are included in the composite output picture are flagged as not-used-for-reference, wherein if the composite output picture is flagged as used-for-reference, reference frame reordering commands are inserted in the slices of pictures received subsequently from the transmitting endpoints prior to their transmission to the at least one receiving endpoints, so that proper operation of the reference picture buffers at the at least one receiving endpoint is ensured.

42. The method of claim 39, further comprising setting the NAL extension headers for SVC of the composite output picture NAL units such that:

the same dependency_id value is used for the NAL units of the composite output picture that correspond to the highest scalable coding layer present in the composite output picture, and the same but successively lower dependency_id value is used for NAL units of successive lower layers;

and setting the temporal_level such that:

when the arriving pictures from the at least one transmitting endpoints are composed so that the temporal levels are synchronized, then the same temporal_level value is used for the NAL units corresponding to the highest scalable coding layer, and successively lower temporal_level values are used for successive lower layers; and when the arriving pictures from the at least one transmitting endpoints are not composed such that the temporal levels are synchronized, then the value 0 is used for all NAL units of the composite output picture.

43. The method of claim 34, wherein assignment of specific portions of the composite output video picture's area to specific transmitting endpoint video signals by the CSVCS is predefined.

44. The method of claim 34, wherein the assignment of specific portions of the composite output video picture's area to specific transmitting endpoint video signals is performed dynamically by the CSVCS, based on:
requests for specific spatial resolutions from the receiving endpoint, requests for specific spatial positions within the composite output picture from the receiving endpoint, and
combinations thereof.

45. The method of claim 34 further comprising taking into account the decoding capabilities or resolution preferences of the at least one receiving endpoints while assigning specific portions of the composite output video picture's area to specific transmitting endpoint video signals.

46. The method of claim 34, wherein the CSVCS is configured to respond to input video signals having different temporal rates or a shift in the arrival times of the input video signals, the method further comprising responding by at least one of:
transmitting an output picture triggered by incoming pictures;
transmitting an output picture based on the maximum frame rate of the input video signals; and
transmitting an output picture based on a predefined time schedule,
and wherein the CSVCS is further configured to respond when a new picture of the input video signals does not arrive on time for transmission, the method further comprising responding by:
transmitting pre-coded slice data that instruct the at least one receiving endpoint to repeat data from a previous picture; and
inserting reference picture list reordering commands in the picture headers of the following picture of the input video signals prior to transmission to the at least one receiving endpoint, to ensure that proper reference picture selection is performed for the said following picture.

47. The method of claim 46, further comprising:
at the CSVCS, discarding and not forwarding received picture data of a transmitting endpoint if lack of the discarded picture data will not adversely affect the decoding process at the at least one receiving endpoint; and
transmitting received picture data of a later picture of the same transmitting endpoint in place of the discarded picture data, so that the pictures of the transmitting endpoint are synchronized with those of the other transmitting endpoints in the composite output video signal that is transmitted to the at least one receiving endpoints.

48. The method of claim 34, wherein the CSVCS is further configured to decode at least the lowest temporal level of the lowest spatial and quality resolutions of the video signals received from the at least one transmitting endpoints, the method further comprising: at the CSVCS, generating an intra encoding for the video signal of the transmitting endpoint that is affected when the composite picture configuration for an existing receiving endpoint needs to change; and
transmitting the intra encoding to the receiving endpoint in place of the corresponding coded picture data received from the said transmitting endpoint.

49. The method of claim 34, further comprising, at the CSVCS generating and transmitting to the one or more receiving endpoints coded picture data for portions of the composite output video picture's area that are not assigned to any transmitting endpoint.

50. The method of claim 34, further comprising, at the CSVCS, generating transmitted coded picture data for the portions of the composite output video picture's area that are not assigned to any transmitting endpoint by one of: coding of new content that is generated dynamically; retrieval of coded data that has been previously computed and stored; and a combination thereof.

51. The method of claim 34, in the case where there is a feedback channel between an endpoint and the CSVCS, further comprising, responding to endpoint instructions communicated via intra content over the feedback channel.

52. The method of claim 34, in the case where the coding dependency of the scalable video coding technique used is such that some enhancement layers are not used as references by other layers, further comprising: flagging such layers as discardable.

53. The method of claim 52, further comprising, at the CSVCS, optionally discarding enhancement layers that are flagged as discardable.

54. The method of claim 34, further comprising, providing bidirectional control channels linking a transmitting endpoint with the CSVCS, and the CSVCS with a receiving endpoint.

55. The method of claim 54, further comprising, conducting a capabilities exchange between the transmitting and receiving endpoints over the bi-directional control channel through the CSVCS, whereby the transmitting endpoint indicates its capabilities in terms of spatial, temporal, quality resolutions, and bit rates, and the receiving endpoint indicates which of these capabilities it supports.

56. The method of claim 54, further comprising, receiving requests at the CSVCS from a receiving endpoint for desired spatial resolution of output video signals.

57. The method of claim 56, further comprising, at the CSVCS, modifying the spatial layout in the composite output picture to accommodate different spatial resolution requests.

58. The method of claim 56, further comprising, from the CSVCS, instructing a transmitting endpoint to add or remove a spatial resolution from its transmitted video signal.

59. The method of claim 34, further comprising, including source identifying information and other information over one of in-band and out-of-band bitstreams sent by the CSVCS.

60. The method of claim 34, further comprising, at the CSVCS, overlaying source identifying information or other conveyed information on one of: (1) the pixels of portions of the composite output picture's area that are assigned to each participant in an output picture, and (2) the pixels of portions of the composite output picture's area that are not assigned to any of the video signals of the transmitting participants.

61. The method of claim 34, further comprising, using the CSVCS to provide at least one of continuous presence, personalized layout, rate matching, error localization, and random entry features to at least one receiving endpoint linked through the CSVCS by selectively multiplexing the video signal layers received from transmitting endpoints as components of the composite output picture, and forwarding the components to the at least one linked receiving endpoint, together with optional additional data generated at the CSVCS that ensures that the composite output signal received at the at least one linked received endpoint is a valid coded video bitstream.

62. The method of claim 34, further comprising, using the CSVCS to respond to bandwidth conditions by at least one of:

statistically multiplexing video signals from a plurality of transmitting endpoints; and synchronizing the composition and transmission of video signals received from transmitting endpoints to stagger larger-than-average video pictures in the composite output video signal.

63. The method of claim 34, wherein using the CSVCS to respond to bandwidth conditions, further comprises:

modifying the bitrate of the transmitted composite output signal by replacing coded picture data that is received from the at least one transmitting endpoint with coded data that indicates to the at least one receiving endpoint to copy the corresponding pixel data from a previous picture, and transmitting the replacement coded data, so that the output bitrate can match desired characteristics.

64. The method of claim 34, further comprising, using the CSVCS to provide at least one of session network border control, media proxy, firewall, and network address translation functions.

65. A non-transitory computer readable medium comprising a set of instructions to direct a processor to perform the methods in one of claims 31 to 60.

66. A method for videoconferencing between a plurality of endpoints over a communications network, the method comprising:

using a conferencing bridge ("Compositing Scalable Video Coding Server" (CSVCS)) linked to at least one receiving and at least one transmitting endpoint by at least one communication channel each;

transmitting coded digital video from at least one transmitting endpoint in either a single-layer coding format or a scalable video coding format; and at the CSVCS, composing input video signals received from transmitting endpoints into a single composite coded digital video output signal, and forwarding the single composite coded digital video output signal to at least one receiving endpoint which is capable of decoding at least one digital video stream coded in a scalable video coding format;

in the case where the communication network comprises a plurality of CSVCS in an cascading arrangement, further comprising:

at least one CSVCS that is not the last one in the cascading arrangement, optionally forwarding without processing composite coded pictures received from CSVCS that are earlier in the cascading arrangement to other CSVCSs; or decomposing the composite coded pictures received from CSVCS that are earlier in the cascading arrangement and recompose them using a different layout prior to forwarding them to other CSVCSs.

67. A method for videoconferencing between a plurality of endpoints over a communications network, the method comprising:

using a conferencing bridge ("Compositing Scalable Video Coding Server" (CSVCS)) linked to at least one receiving and at least one transmitting endpoint by at least one communication channel each;

transmitting coded digital video from at least one transmitting endpoint in either a single-layer coding format or a scalable video coding format; and at the CSVCS, composing input video signals received from transmitting endpoints into a single composite coded digital video output signal and forwarding the single composite coded digital video output signal to at least one receiving endpoint which is capable of decoding at least one digital video stream coded in a scalable video coding format;

in the case where the communication network comprises at least one SVCS and at least one CSVCS in an cascading arrangement, further comprising:

at the at least one SVCS, selecting only some or all data of the video signals received from the transmitting endpoints or other SVCSs, and forwarding the selected data to other SVCSs or CSVCSs; and at a CSVCS, which is the last server in the cascading arrangement, creating the composite coded output picture for transmission to the one or more receiving endpoints.

* * * * *